United States Patent [19]

Lewis

[11] Patent Number: 4,817,006

[45] Date of Patent: Mar. 28, 1989

[54] PHARMACEUTICAL TABLET PRESS CONTROL MECHANISM

[75] Inventor: David A. Lewis, Lake Zurich, Ill.

[73] Assignee: Thomas Engineering, Inc., Hoffman Estates, Ill.

[21] Appl. No.: 141,581

[22] Filed: Jan. 7, 1988

Related U.S. Application Data

[63] Continuation of Ser. No. 845,884, Mar. 28, 1986, abandoned.

[51] Int. Cl.⁴ .......................... G06F 15/46; B29C 3/06

[52] U.S. Cl. .................................... 364/476; 364/134; 364/468; 425/149; 425/170; 425/171; 264/40.5

[58] Field of Search ............... 364/476, 473, 468, 469, 364/134; 425/147, 149, 170, 171, 173; 264/40.1, 40.5, 40.7

[56] References Cited

U.S. PATENT DOCUMENTS

| | | | |
|---|---|---|---|
| 2,906,214 | 9/1959 | Frank . | |
| 2,992,729 | 7/1961 | Curtius . | |
| 3,000,331 | 9/1961 | Frank . | |
| 3,063,390 | 11/1962 | Frank . | |
| 3,255,716 | 6/1966 | Knoechel et al. | 425/170 |
| 3,734,663 | 5/1973 | Holm | 425/149 |
| 3,791,205 | 2/1974 | Hooker . | |
| 3,857,659 | 12/1974 | Knapp . | |
| 3,891,375 | 6/1975 | Pilewski et al. . | |
| 4,099,239 | 7/1978 | Williams | 364/476 |
| 4,100,598 | 7/1978 | Stiel et al. | 364/476 |
| 4,109,309 | 8/1978 | Johnstone | 364/474 |
| 4,121,289 | 10/1978 | Stiel et al. | 364/476 |
| 4,149,235 | 4/1979 | Froyd et al. | 364/134 |
| 4,199,539 | 4/1980 | von Herrmann et al. | 425/171 |
| 4,212,057 | 7/1980 | Devlin et al. | 364/200 |
| 4,238,431 | 12/1980 | Stuben et al. . | |
| 4,396,564 | 8/1983 | Stüben et al. | 425/149 |
| 4,547,140 | 10/1985 | Davis . | |
| 4,570,229 | 2/1986 | Breen et al. | 364/476 |
| 4,577,344 | 3/1986 | Warren et al. | 364/134 |

OTHER PUBLICATIONS

870 Manufact. Chemist & Aerosol News, vol. 50, No. 4 (1979-04) "Recent Developments In Tabletting Technology".

*Primary Examiner*—John R. Lastova

*Attorney, Agent, or Firm*—McAndrews, Held & Malloy, Ltd.

[57] ABSTRACT

Control and monitoring instrumentation for a high speed double rotary tablet press mechanism is disclosed. Each tablet press side has strain gauges producing signals indicative of table compression. The strain gauges generate control signals received by a peak detector, which holds the maximum strain signal. The peak signals are converted to digital form and provided to a microprocessor that first controls operation of the reject gate and regulates tablet consistency by controlling powder fill into the dies, and second, passes information to RAM. The RAM is shared by a master CPU, clocked 180° out of phase with the microprocessor. The master CPU produces either a CRT or printed output of both raw and statistically abstracted tablet press data.

19 Claims, 18 Drawing Sheets

PHARMACEUTICAL TABLET PRESS CONTROL MECHANISM

This application is a continuation of application Ser. No. 845,884, filed on Mar. 28, 1986, which is a continuation-in-part application of Ser. No. 717,526, filed Mar. 29, 1985, now abandoned.

BACKGROUND OF THE INVENTION

This invention relates to pharmaceutical tablet press mechanisms, and more particularly, relates to a control and monitoring system for operation of a high speed rotary tablet press.

Rotary tablet press mechanisms designed to compress and form medicinal or related powders or granules into tablets have long been known in the pharmaceutical art. An example of prior art tablet presses is disclosed in U.S. Pat. No. 3,255,716 issued June 14, 1966. In such rotary presses, powders or other materials that can be formed into tablets are placed in one of a plurality of generally cylindrical dies mounted within a rotary die holding turret. A pair of opposed cam operated punches compress the powder from both ends of each tablet forming die and thereby compact the powder into an individual tablet. The rotary turret arrangements allows a plurality of punch and die sets to continuously produce tablets around the circular path followed by the rotary press by sequentially contacting a arrangement of cam above and below the turret that lift and lower the punches. In modern tablet press machines, pharmaceutical tablets are produced at rates as high as 12,000 tablets per minute.

It is highly desirable that all tablets prepared by rotary tablet press mechanisms be of uniform and precisely controlled size and weight. This is especially true for medicinal tablets, as carefully prescribed dosage amounts are difficult to achieve without accurate tablet size and weight control Inaccuracies in tablet size and weight stem from a variety of different circumstances, but most commonly result from uneven introduction of the powders into the die and punch combinations. Inaccuracies can also result from imperfections or wear in the tablet press or die elements, or from changes in the density or moisture content of the compressed powder.

Several prior art mechanisms have been employed to evaluate the weight of compressed tablets and determine if such tablets are defective. Generally, individual tablets are monitored by evaluating the compression between the punches during tablet formation. Overweight tablets, resulting from excessive powder or granular material placed between the opposing punches, will cause higher than normal compacting forces. Likewise, underweight tablets, resulting from a smaller than normal quantity of powder or granular material between the opposing punches, will result in less than normal compressive forces between the opposing punches. Thus over and underweight tablets are typically detected in tablet presses through use of a strain gauge (or related mechanism) for measuring the forces in the opposing punches. Such a strain gauge is disclosed in U.S. Pat. No. 3,791,205 issued on Feb. 12, 1974. U.S. Pat. No. 3,734,663, issued May 22, 1973, discloses a control circuitry that monitors, and if necessary, changes the amount of powder placed in the die in response to measured tablet compressive forces, as detected by changes in resistance in a strain gauge.

Tablet press mechanisms also typically include a structure for removing the formed tablet from the punches and dies. Normally, rotary tablet press mechanisms include a second cam system that causes the lower punches to lift the formed tablet, after compression, to the surface of the rotating turret. A blade or the like is then disposed slightly above the rotary disc at a location intersecting the path of the dies and hence the tablets that have been lifted from the dies. Contact of the tablet with the blade then scrapes the tablets from the turret to a discharge shoot.

Often, blade mechanisms of the kind described above are combined with a reject gate, such as is disclosed in U.S. patent application Ser. No. 650,346 filed Sept. 13, 1984, and owned by the same entity as the present application. Defective tablets are detected through analysis of the punch forces as established by the strain gauge, and a pneumatic air jet is timed to deflect defective tablets away from the blade into a reject chute. Proper operation of such a mechanism requires instrumentation for precise control of the pneumatic air jet in response to a signal indicating a defective tablet. Such instrumentation in turn requires highly precise devices to produce the signal indicating the specific defective tablet to be rejected. For very high speed mechanisms, such as those producing as much as 12,000 tablets per minute, even minor imprecisions can result in rejection of other than the specific defective tablet. To avoid such failures, tablet press control mechanisms are usually set to reject plurality of tablets in the vicinity of the detected defective tablet.

Additionally, unnecessary tablet rejection can be minimized if precise information regarding individual punch compression activity can be evaluated by an operator with a number of indicia displayed. Thus, when an operator is able to monitor compression forces precisely during the operation of the rotary press, and receives such further information as the range of compressing force produced by each punch set and statistical comparisons of the forces produced over time during press operation, mechanical and component wear problems can be identified while still incipient, and can thereafter be corrected before the problem is exacerbated. Likewise, individual mechanical variations between punches or cams can be detected, and adjustments made to compensate for differing die and punch wear or differing adjustment of other individual press components.

Many rotary press tablet machines that require monitoring are double acting presses, that is, the machine possesses a set of compressive cams on opposite sides of the turret that act simultaneously to produce tablets. For such double rotary tablet presses, a dual system of compression detectors, monitors, reject gates, and control systems is highly advantageous. Such dual monitoring allows comparison of the operation of each side of the tablet press during operation, so that to the extent possible, the operator can maintain equal efficiency of each side.

Accordingly, it is an object of this invention to provide a pharmaceutical tablet press control mechanism suitable for use with a double rotary tablet press that precisely monitors both tablet compression information and defective tablet rejection information.

It is a further object of this invention to provide such a press that monitors compression force for each individual punch set.

It is an additional object of this invention to provide such a press control and monitoring mechanism that provides information to an operator regarding press compression concurrent with operation of the system.

Another object of this invention is to provide such a tablet press control and monitoring system that produces a statistical abstract of press compression information.

Yet another object of this invention is to provide such a tablet press control and monitoring system that produces detailed information regarding tablet press performance concurrent with press operation in a manner that is both visually descriptive and relatively easy to use.

SUMMARY OF THE INVENTION

These and other objects of the invention are achieved by providing control and monitoring instrumentation for a high speed double rotary tablet press mechanism. Each side of the mechanism has three strain gauges producing signals indicative of tablet final compression, precompression and compression during tablet release. The strain gauges generate control signals that are received by a peak detector, which holds the peak signal representing maximum strain. The peak signals are converted to digital information, which is then provided to a microprocessor.

The microprocessor performs two functions. It first controls operation of the reject gate and regulates tablet consistency by controlling powder fill into the dies. Second, it passes information on to a Random Access Memory unit. The RAM is shared by a master CPU that is clocked 180 degrees out of phase with the microprocessor. The master CPU processes the RAM information and produces either a CRT or printed output of both raw and statistically abstracted tablet press data.

DETAILED DESCRIPTION OF THE PREFERRED EMBODIMENT

Figure 1:
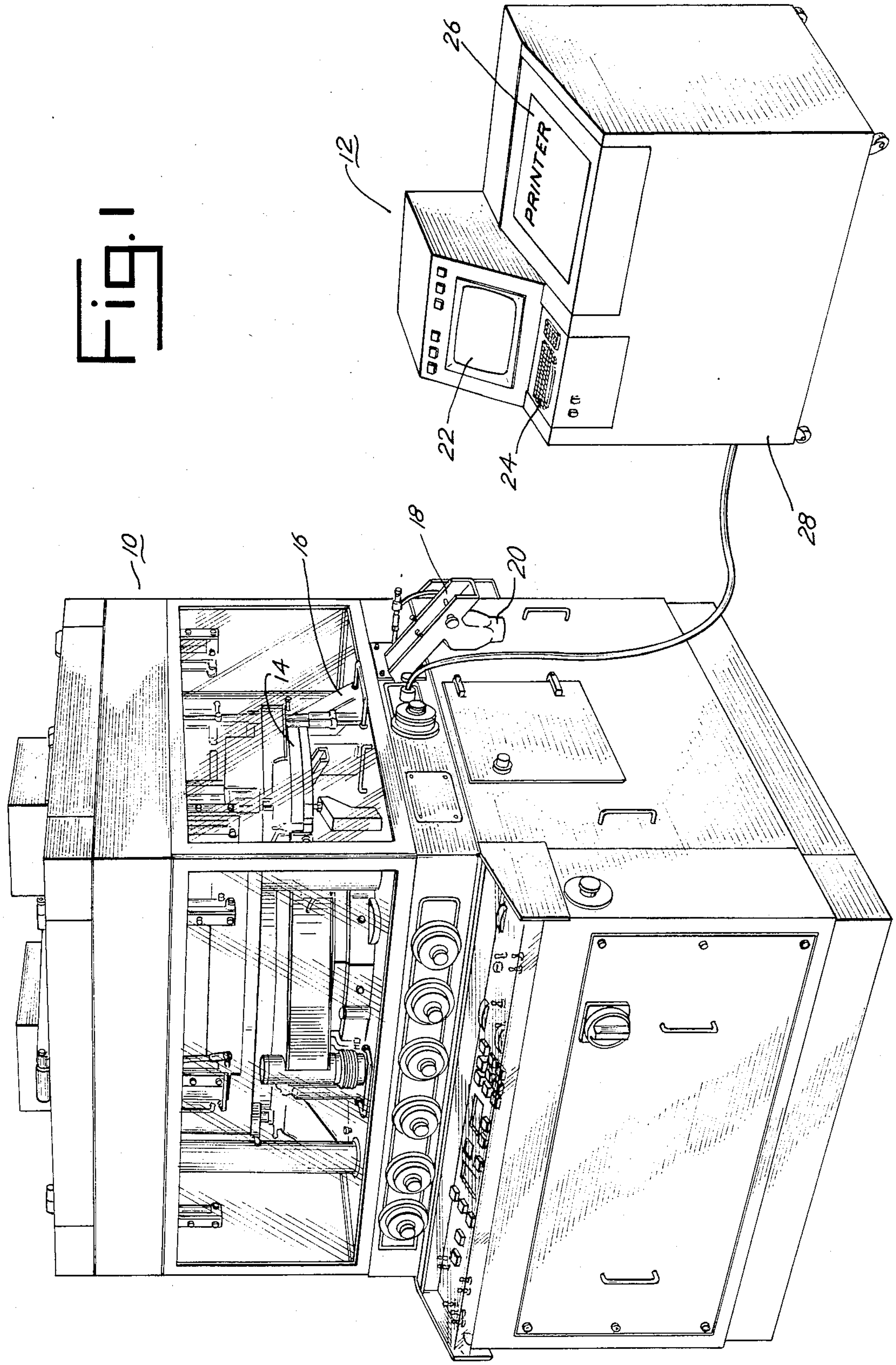
FIG. 1 is a pictoral perspective illustration of a pharmaceutical tablet press mechanism connected to a tablet press controller constructed in accordance with this invention.

Referring now to FIG. 1, a tablet press mechanism 10 is illustrated along with a controller 12. The tablet press mechanism includes a rotary turret 14 holding a plurality of dies (not shown in FIG. 1) for the formation of tablets from powders compressed between punches (also not shown in FIG. 1). The rotary turret 14 rotates at a high angular velocity between an upper and lower cam mechanism for operation of the tablet forming punches. Once formed, tablets are moved from the vicinity of rotary turret 14 to an eject duct system 16 and to an exit duct 18. Defective tablets are ejected from the reject exit 20.

The preferred embodiment of the invention includes controller 12 having a CRT display 22 and an alphanumeric input 24. Controller 12 includes a printer 26 for printing fixed information as requested by the operator. For convenience, the entire controller 12 is contained within a unitary cabinet 28 that is preferably movable on wheels.

Figure 2:
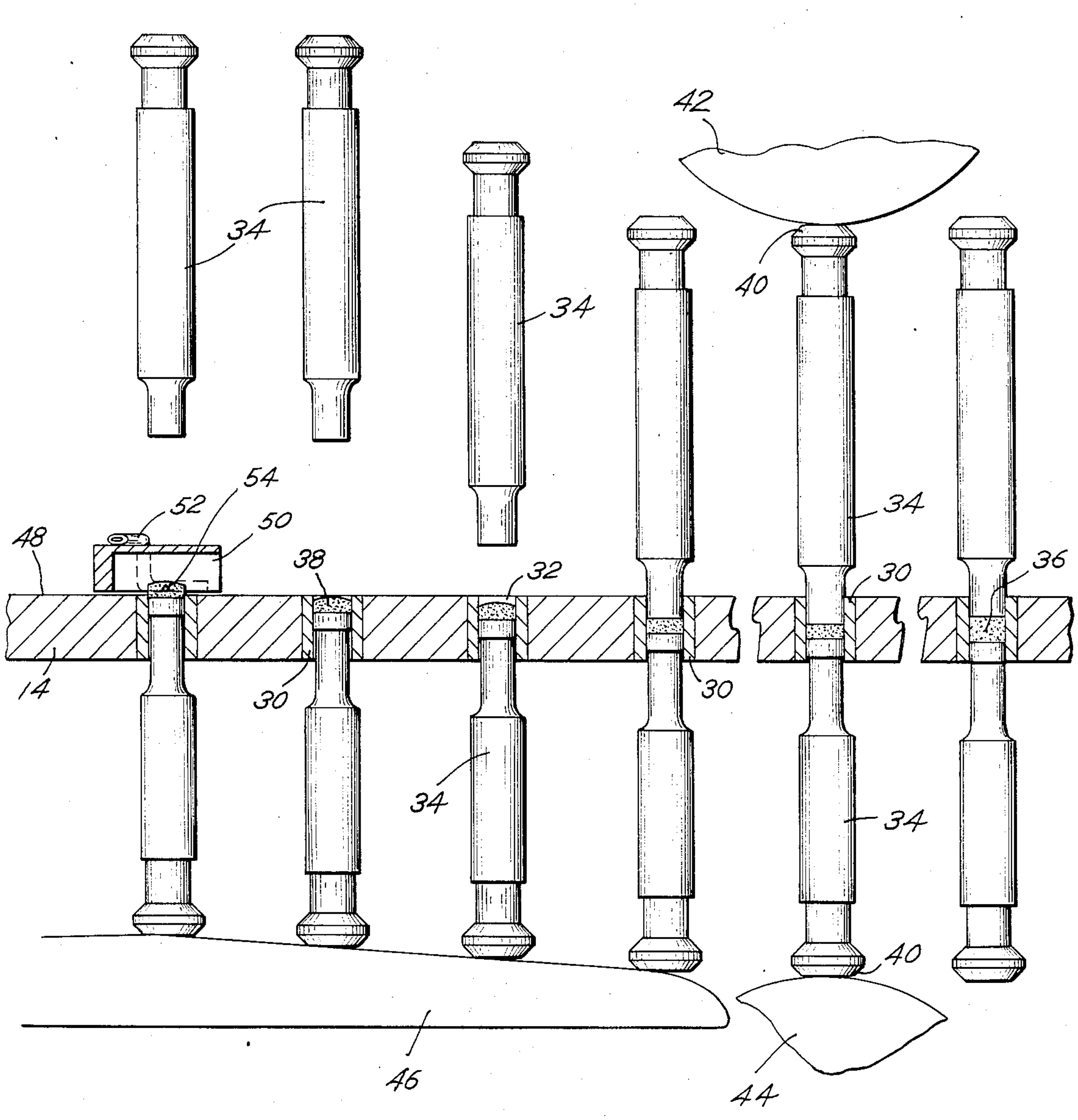
FIG. 2 is a side cross-sectional view of a portion of the tablet press mechanism illustrated in FIG. 1 showing the tablet press dies.

Referring now to FIG. 2, a portion of the tablet punch and die mechanism is illustrated. A plurality of dies 30 are mounted within rotary press turret 14. Each die defines a cylindrical cavity 32 into which punches 34 may slide vertically for tablet formation. Medicinal powder 36 is inserted into cylindrical cavity 32 and compressed between the punches to form a tablet 38. The compressive action of punches 34 result from connection of the punch heads 40 with an upper cam 42 and a lower cam 44. Each punch 34 is operated by cams 42 and 44 and by rotation of rotary turret 14, since the cams are fixed with respect to the turret and the punches rotate with the turret.

Removal of the formed tablet 38 from the cylindrical cavity 32 is affected by operation of a lifting cam 46 contacting only the lower punches such that as the turret rotates, tablet 38 is lifted to the top surface 48 of the rotary turret 14.

Tablets 38 are then moved from the top surface 48 of the rotary turret 14 by a guide wall 50. Defective tablets are ejected from the vicinity of guide wall 50 by a pneumatic jet of air from a nozzle 54 of pneumatic tube 52.

Figure 3:
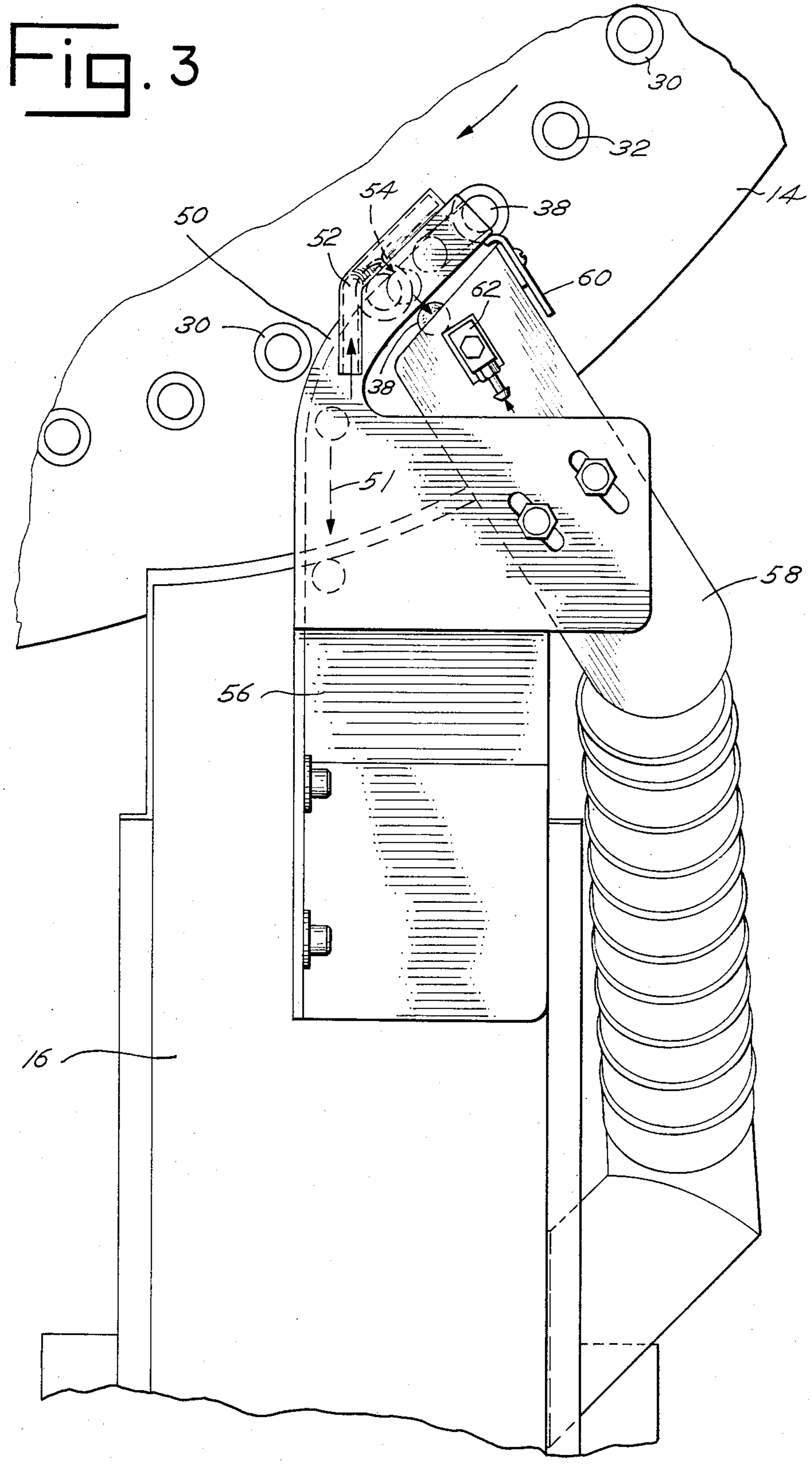
FIG. 3 is a top plan view of a portion of the tablet press mechanism illustrated in FIGS. 1 and 2, showing separation of the formed tablets from the dies and the mechanism for rejection of defective tablets.

Referring now to FIG. 3, tablets 38 rotate clockwise with rotating turret 14. As tablets 38 rise from cylindrical cavity 32, they contact guide wall 50 which guides the tablets from the vicinity of dies 30 along an ejection path 51. The tablets 38 are deflected downwardly by a downward slanting wall 56 to eject duct 16 and out exit duct 18 (FIG. 1). Rejected tablets are moved by a pneumatic jet of air from nozzle 54 into a reject area 58 and out reject exit 20 (FIG. 1). In the preferred embodiment, the reject gate includes a constant low pressure air flow of approximately 5 P.S.I. from a low pressure tube 60. The constant air flow improves rejection of unusually shaped tablets. Also in the preferred embodiment, the reject gate includes a constant air flow from an upper nozzle 62 to create a vacuum in the reject area 58. Details of the operation of the preferred embodiment of the reject gate are contained in co-pending U.S. patent application Ser. No. 650,346, filed Sept. 13, 1984, and owned by the same entity as the present application.

Figure 4:
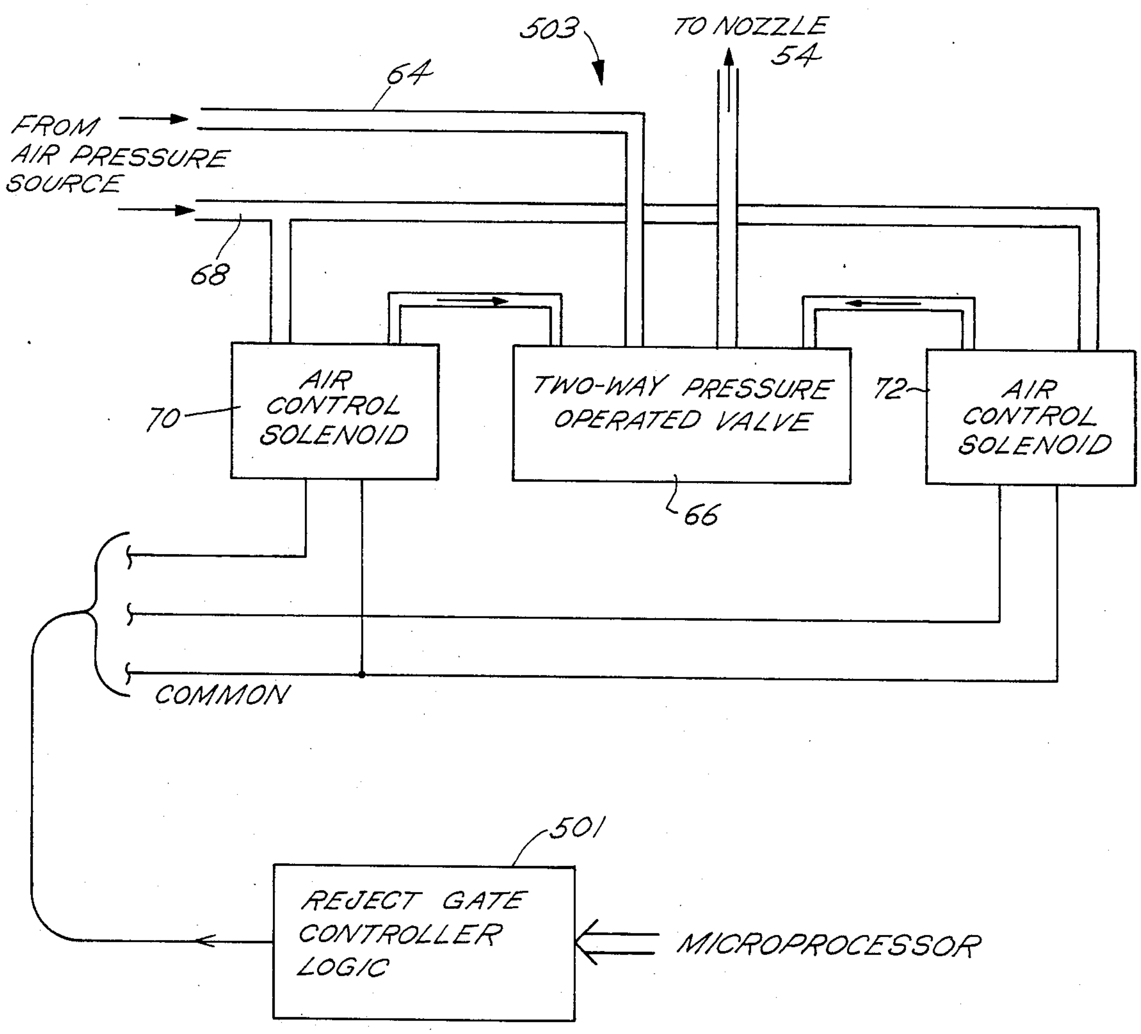
FIG. 4 is a schematic illustration of the operation of the pneumatic tablet rejection system.

Referring now to FIG. 4, control of the pneumatic jet through the nozzle 54 is illustrated. Generally, pressurized air from an air pressure source (not shown) is fed through a conduit 64 to a two-way pressure operated valve 66. Valve 66 gates the air from conduit 64 to nozzle 54.

Pressurized air from the air source is also provided to first and second air control solenoids 70 and 72 via a conduit 68. Each air control solenoid 70, 72 is controlled by a reject gate controller logic 501 (as described hereinafter). When air control solenoid 70 is actuated by reject gate controller logic 501, air from conduit 68 is passed to the two-way pressure operated valve 66, sliding valve 66 to the right, opening the path of air pressure from conduit 64 and out through nozzle 54. Similarly, actuation of air control solenoid 72 slides the two-way operated pressure valve 66 to the left, which closes the path of air flow from conduit 64 to nozzle 54, thus cutting off the air flow.

Figure 5:
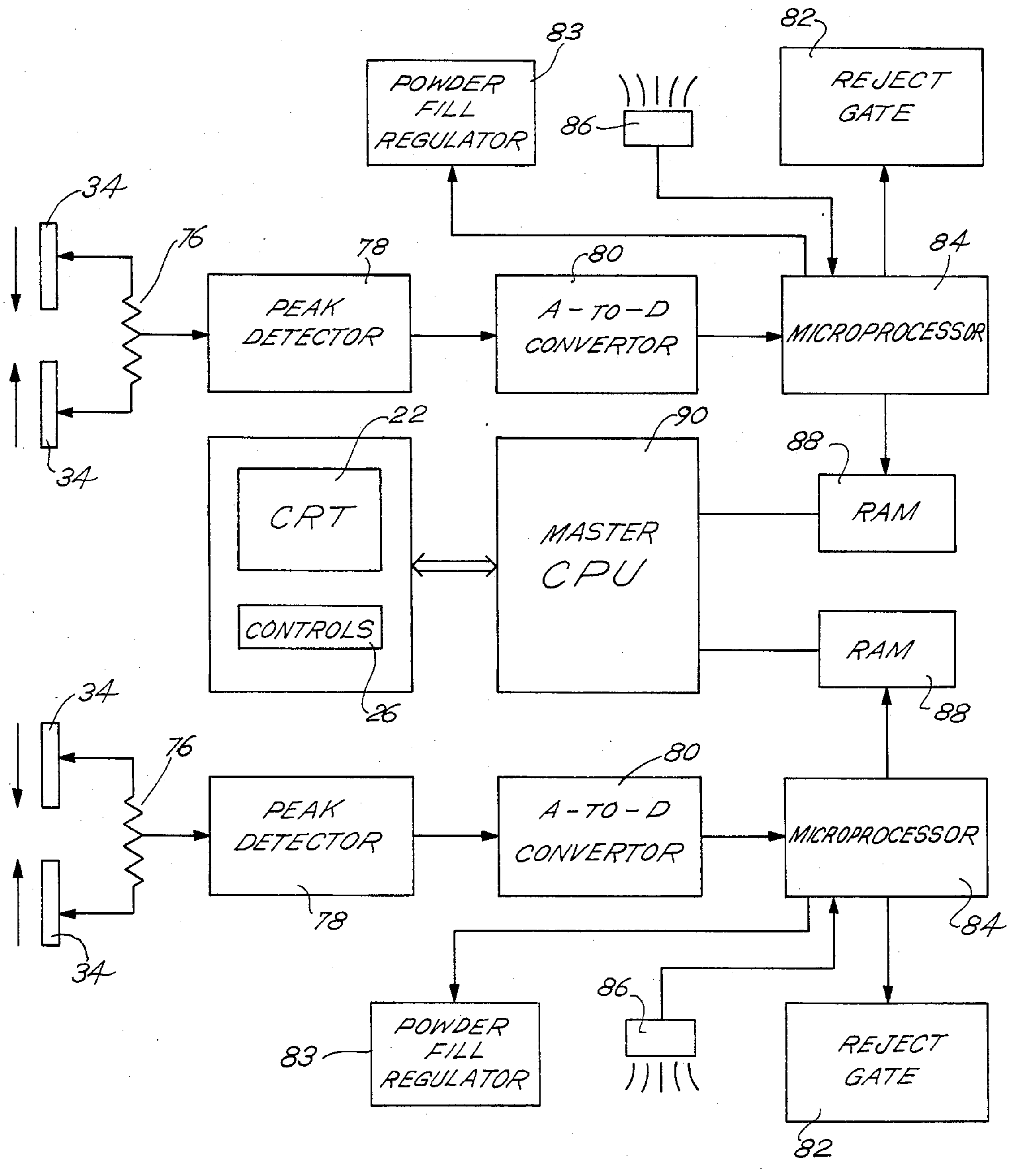
FIG. 5 is a schematic diagram of the control system of the controller of FIG. 1.

The tablet press is generally configured as a double-sided rotary tablet press, that simultaneously compresses and forms tablets on opposite sides of the rotary turret at separate compression stations. As shown in FIG. 5, the tablet press has two sets of three separate strain gauges 76 (one for each set is shown in FIG. 5). One set of three gauges is located at a respective compression station.

To simplify the description, the monitoring of the three gauges at one station will be described.

One of the three strain gauges monitors the compression force between rollers 42 and 44 (FIG. 2) to indicate the compression force which occurs at the time of tablet compression, i.e., final compression. A second strain gauge monitors the compression force between a pair of precompression rollers similar to and positioned upstream of rollers 42, 44. Precompression occurs prior to the final compression in order to slightly compact the powder to remove air from within the die cavity prior to compression. A third strain gauge monitors cam 46 (FIG. 2) at the time of "release" when the punch has moved to its upward position placing tablet 38 on the top of surface of the turret.

Each of the strain gauges 76 generates a control signal which is received by one of three peak detectors 78 that determines the peak of the control signal which represents the maximum strain on punches 34 at the associated compression, precompression or release stage. A plurality of peak detectors are utilized in the event that a strain reading of one punch occurs simultaneously with a strain reading of a following punch. The separate peak detectors hold the strain peak voltage reading until the control system is able to read it. The analog signal from each peak detector is converted to a digital signal by an analog-to-digital converter 80. The digital signal is retrieved by a conventional microprocessor 84 which processes the signal for storage of information in random access memory (RAM) 88. Microprocessor 84 also controls reject gate 82 and a powder fill regulator 83 in accordance with processing of the retrieved strain gauge information.

Information is also provided to microprocessor 84 by a plurality of magnetic sensors, generally indicated by diagram block 86. The magnetic sensor monitor the movement of the turret relative to the associated compression station as well as monitor the proximity of the gauged tablet to the reject gate.

A master CPU 90 communicates with both RAMs 88 for retrieving the data processed by both microprocessors 84. Each microprocessor is responsible for monitoring a single compression station on one side of the tablet press. Each microprocessor 84 stores in its respective RAM processed data based on information retrieved from its compression area. Master CPU 90 is able to retrieve from both RAMs the information necessary to communicate with the operator via a CRT 22.

Each microprocessor 8 looks at the individual punches of the tablet pres for retrieving a plurality of data information to be stored in RAM 88 for each turret revolution. For example, for a tablet press which has 75 punches, microprocessor 84 will process data associated with each of the 75 punches and store the data in tabulated form in RAM 88.

Master CPU 90 on the other hand, retrieves from RAM 88 tabulated information on a once per turret revolution basis.

Master CPU 90 may select and modify the program of microprocessor 84 for requesting the microprocessor to interrupt the master CPU at selected times, for example, before the processor changes peak compression values stored in RAM. The master CPU inserts into the code of the microprocessor certain flags for communicating the time of interrupt. The program of the processor is stored in RAM which is accessible by the CPU.

In general terms, each reject gate 82 and powder fill regulator 83 is controlled by its respective microprocessor 84. Also, each microprocessor stores data related to compression and release forces of its associated compression station. In the preferred embodiment, that data includes not only the compression forces at peak compressions, but compression forces during "precompression" and during "release". The data stored in each RAM 88 is accessed by master CPU 90, allowing the master CPU to process the tabulated data and provide a variety of CRT displays of the current activity of the rotary press.

Figure 6:
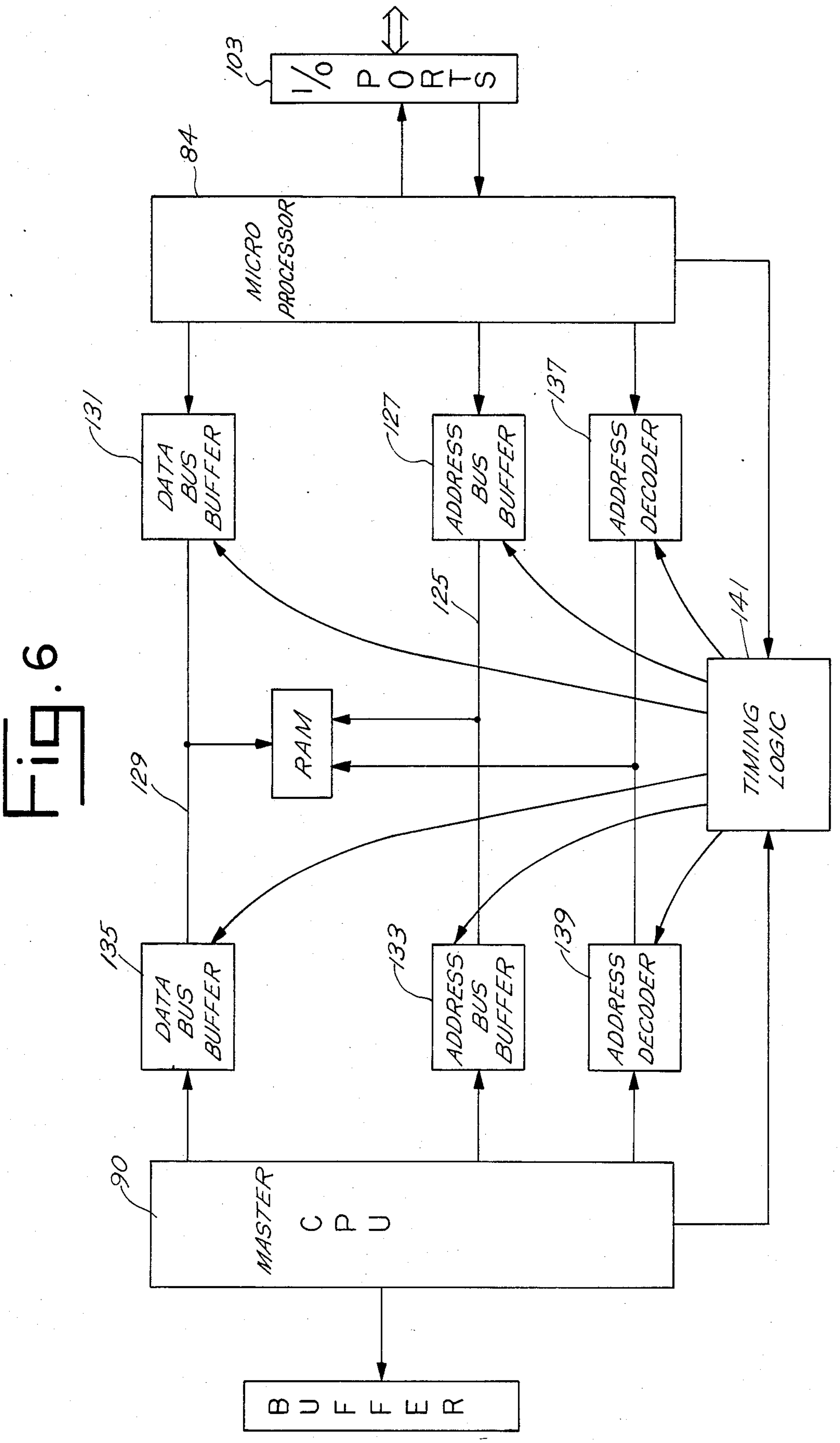
FIG 6 is a block diagram showing a master CPU and microprocessor of the control system of FIG. 5.

Referring now to FIG. 6, microprocessor 84 controls the operation of peak detection circuitry, rejection gate circuitry and powder fill regulator circuitry via input/output ports 103. The data retrieved by the microprocessor is processed and stored in RAM 88.

Microprocessor 84 addresses RAM 88 along an address bus 125 via an address buffer 127. RAM 88 responds to the address information appearing on bus 125 for reading into or writing out of the addressed location of RAM 88. The data appearing on a data bus 129 is read into or out from RAM 88. Microprocessor 84 transmits to or receives data from data bus 129 via a data bus buffer 131.

Similarly, master CPU 90 addresses RAM 88 via an address bus buffer 133. Data received from or transmitted to RAM 88 by master CPU 90 is performed via a data bus buffer 135. Data bus buffer 135 and address bus buffer 133 are connected to respective busses 129, 125.

A pair of address decoders 137, 139 are utilized respectively by microprocessor 84 and master CPU 90 in order to enable RAM 88 for storage or retrieval of data. In order to share RAM 88, a timing logic 141 supervises access to RAM 88 by either microprocessor 84 or master CPU 90.

The clock phases of master CPU 90 and microprocessor 84 are out of phase by 180 degrees. Thus, as the microprocessor 84 is setting up its address information into address buffer 127 and decoder 137, the master CPU may access RAM 88. And when master CPU 90 is setting up its address information in buffers 133 and 139, microprocessor 84 may access the RAM. Timing logic 141 performs arbitration between the data bus and the address bus to make sure there is no bus contention between the microprocessor 84 and CPU 90.

Figure 7:
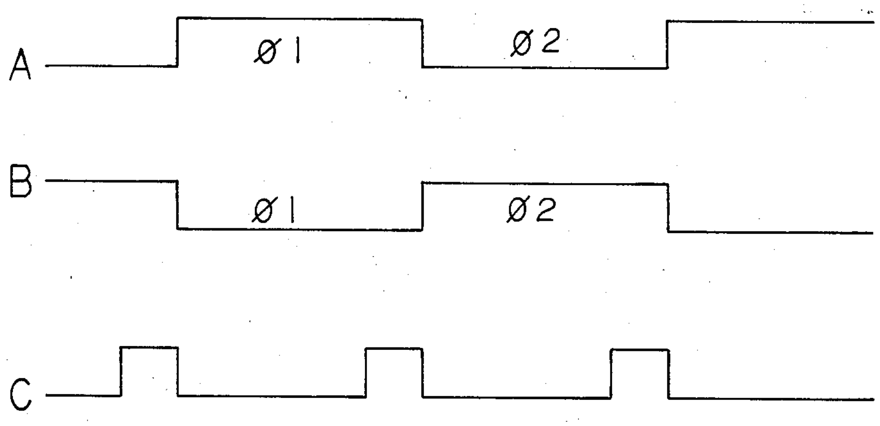
FIG. 7 is a graphical representation of the clock waveforms and timing waveform of the CPU and microprocessor of FIG. 6.

As shown in FIG. 7, graph A represents the master clock of processor 84 and graph B represents the master clock of CPU 90. Both clocks are out of phase by 180 degrees. Graph C on the other hand, represents a pulse generated by timing logic 141 that places a dead band area at the time of switchover of the master clocks. This pulse is used to prevent contention between the microprocessor and CPU on the address and data buses.

Figure 8:
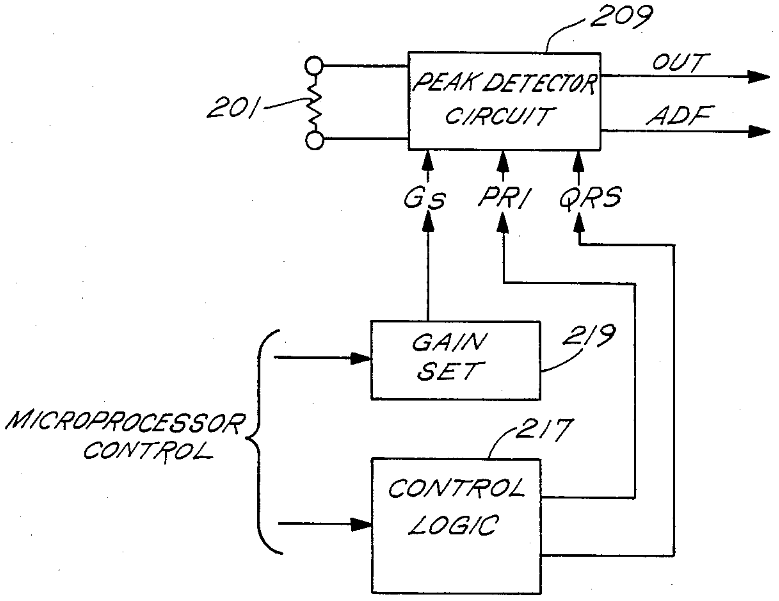
FIG. 8 is a block diagram of a peak detector circuit of the control system of FIG. 5.

Referring to FIG. 8, a strain gauge 201 is monitored by a peak detector circuit 209. Peak detector 209 is controllable by microprocessor 84 via a control logic 217 and a gain set circuit 219. The peak detector 209 generates a pair of output signals OUT and ADF.

Peak detector 209 monitors the strain gauge at the time of final compression of the tablet press. In the preferred embodiment of controller 12, three peak detector circuits like those of FIG. 8 are utilized. One peak detector monitors the strain gauge which represents the final compression of the tablet punches. A second peak detector monitors a strain gauge which represents the precompression of the tablet punches and a third peak hold circuit monitors a strain gauge which represents the release of the tablet press punches. Other like peak detector circuits may be utilized for other machine strains as will suggest itself.

Figure 9:
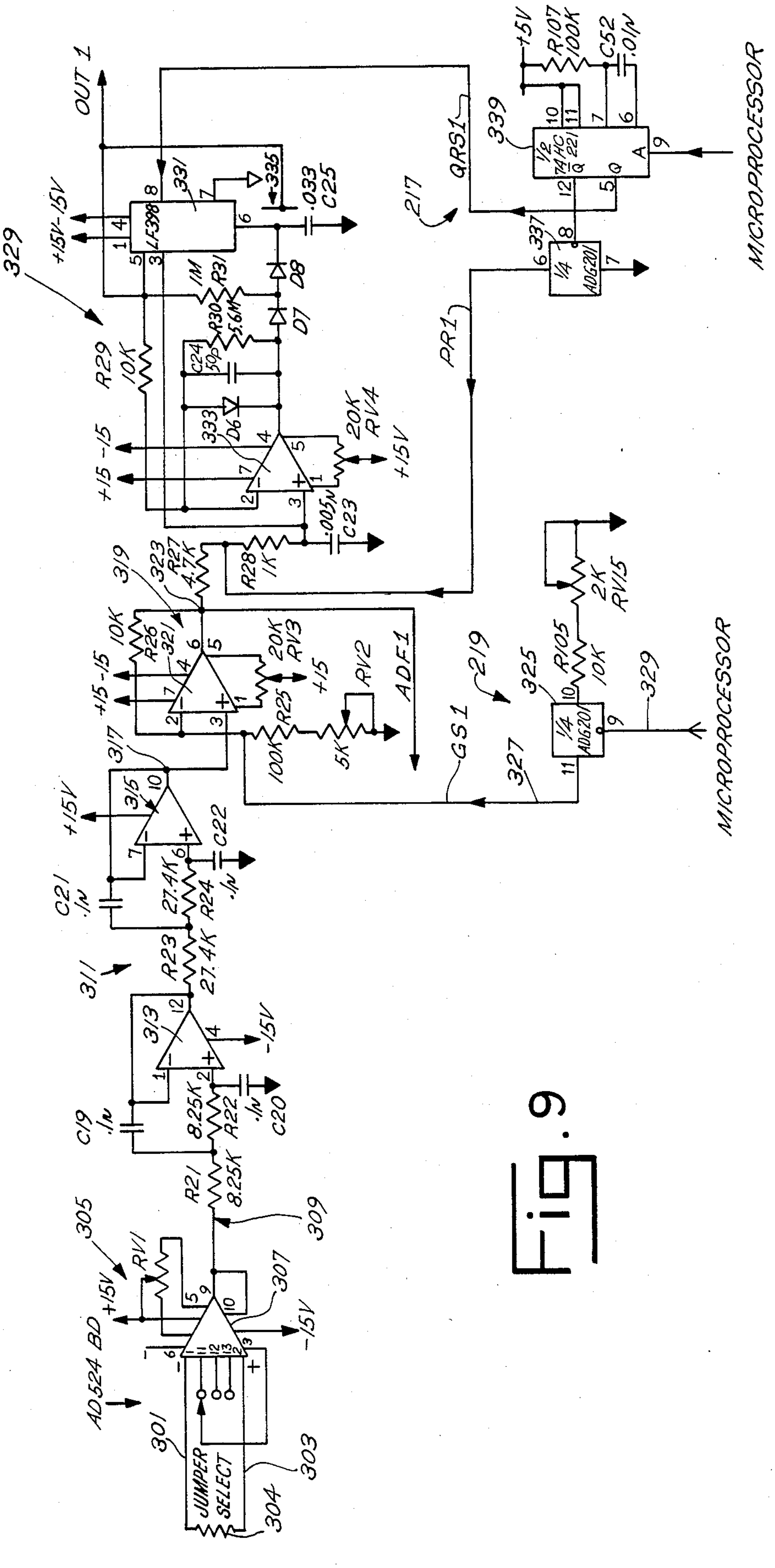
FIG. 9 is a schematic diagram of the peak detector of FIG. 8.

Referring to FIG. 9, peak detector 209 is illustrated in more detail. A pair of input conductors 301, 303 are connected across a conventional strain gauge 304 for monitoring the voltage level impressed across the gauge in a conventional manner. A 1000 gain amplifier circuit 305, formed of an op amp 307, generates a voltage signal at a node 309 representative of the strain recorded by guage 304. Amplifier circuit 305 includes a variable resistor RV1, interconnected to op amp 307 as shown.

A low pass filter 311 formed of a pair of operational amplifiers 313,315, receive the strain voltage signal from node 309 for generating a low pass filtered strain signal at node 317. Low pass filter 311 is conventional is construction including resistors R21–R24 and capacitors C19–C22, interconnected as shown.

The filtered strain signal appearing at node 317 is input to a gain set stage 319 which is variably controlled by gain set logic 219. Gain set stage 319 is formed from an operational amplifier 321, resistors R25, R26, variable resistors RV2, RV3 interconnected as shown. The output of op amp 321 generates an output ADF at node 323. The purpose of the gain set stage is to permit the microprocessor to select a higher gain for lower compression voltages in order to utilize the maximum range of the A-to-D converter.

Gain set logic 219 is formed of an analog switching device 325, resistor R105, and variable resistor RV15 interconnected as shown. Switching device 325 connects resistor R105 and variable resistor RV15 to conductor 327, in response to microprocessor command.

The ADF signal at node 323 passes to a conventional peak detector and hold circuit 329. Peak detector and hold circuit 329 includes a sample hold amplifier 331, op amp 333, a guard ring 335, (to prevent bleeding of holding capacitor C25) diodes D6–D8, resistors R27–R31, variable resistor RV4, and capacitors C23–C25, interconnected as shown. Circuit 329 detects the peak voltage of the ADF signal and generates an OUT signal which is a D.C. level of the peak voltage detected.

Figure 10:
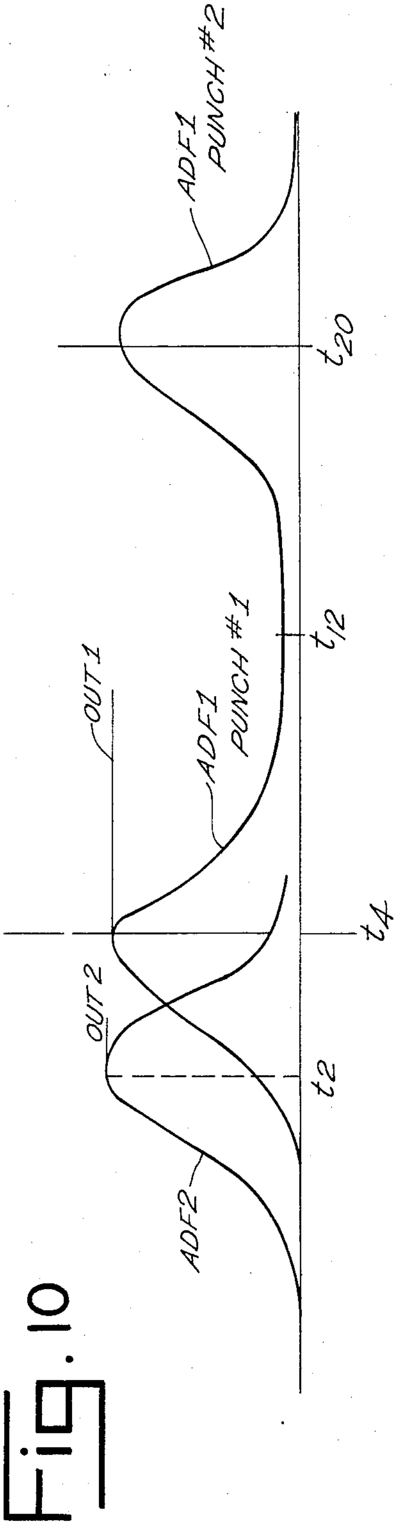
FIG. 10 is a graphical representation of the waveforms associated with the peak detector of FIG. 9.

As shown in FIG. 10, the ADF1 compression waveform has a peak voltage or OUT1. The peak voltage of ADF1 occurs at time t4. A second strain gauge waveform ADF2 is shown having a peak voltage OUT2 at time t2. The peak detector circuit 329 monitors the ADF curve and generates the OUT signal as the peak voltage.

Referring again to FIG. 9, control logic 217 generates a PR1 output between resistors R27, R28 and generates QRS1 output to input 8 of hold amplifier 331. These two signals PR1 and QRS1 serve to reset circuit 329 to zero in order to prepare detector and hold circuit 329 for generating the next OUT1 signal of the following punch. Microprocessor 84 controls actuation of logic 21 for resetting the detector and hold circuit 329 at the appropriate time between peaks.

Control logic 217, which is activated by the microprocessor, is formed from an analog switch 337 and a monostable multivibrator 339, resistor R107 and capacitor C52 connected as shown. Logic 217 generates a PR signal and a QRS signal which resets peak detector and hold circuit 329. Logic 217 generates PR and QRS in response to command from microprocessor 84.

Figure 11:
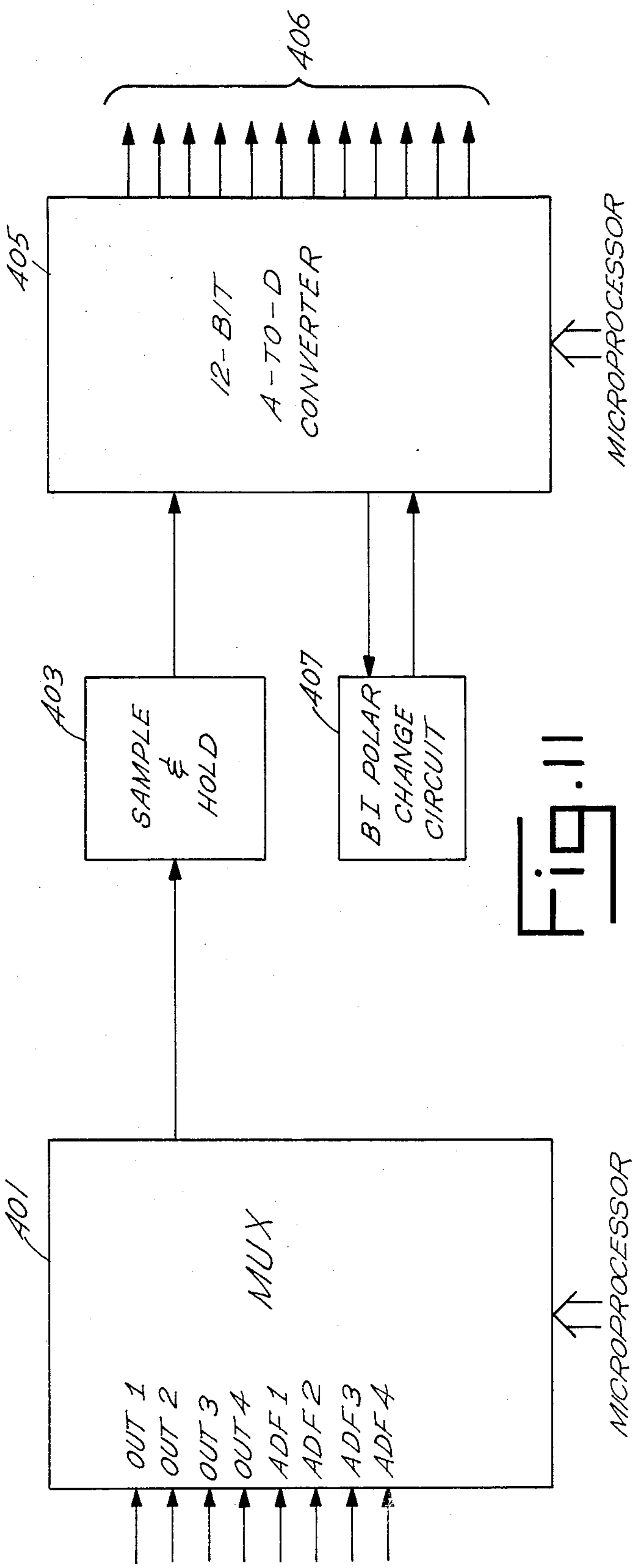
FIG. 11 is a block diagram of a multiplexer and A-to-D converter circuit, of the control system of FIG. 5.

Referring to FIG. 11, a multiplexer 401 monitors the OUT and ADF signals of up to four peak detector circuits 209. Multiplexer 401 is controlled by microprocessor 84 for transmitting a selected ADF or OUT signal to a sample and hold circuit 403. A 12-bit A-to-D converter 405 converts the signal stored in sample and hold circuit 403 to a digital output onto microprocessor bus 406 and determines whether the signal of sample and hold circuit 40 is below zero volts. If the signal goes below zero volts, an error signal is generated.

A-to-D converter 405 is switchable by microprocessor 84 through a conventional bipolar converter 407 for checking whether the signal, stored in sample and hold circuit 403 is negative. Microprocessor 84 commands converter 405 to look for a negative voltage and that indication is placed on data bus 406. If the microprocessor senses that a negative signal has been generated, it reports to the operator via CRT 21, indicating an error signal.

Figure 12:
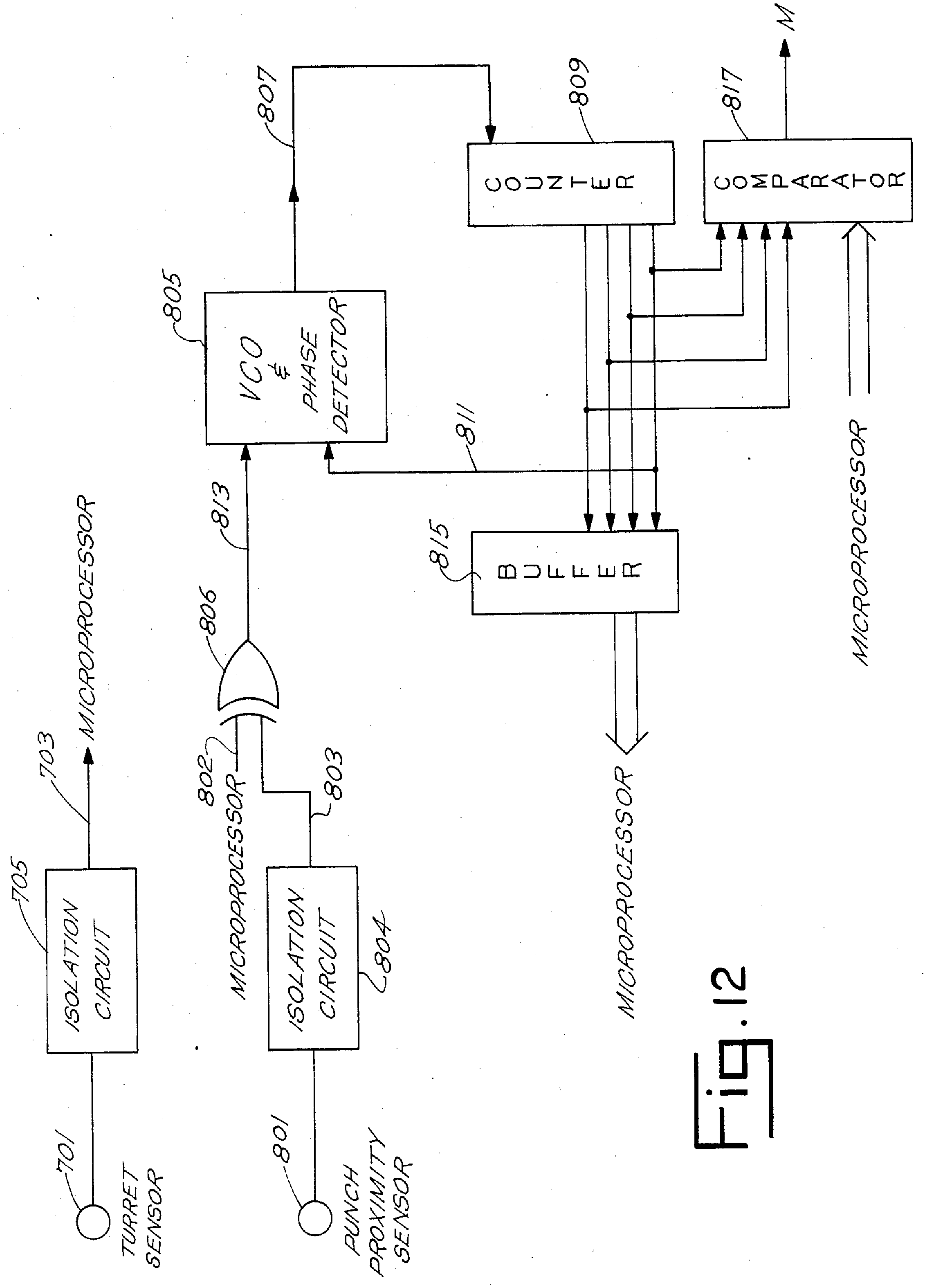
FIG. 12 is a block diagram of a sensor/timing circuit of the control system of FIG. 5.

Referring to FIG. 12, a punch proximity sensor 801 is positioned in a fixed relationship with the tablet press for monitoring rotating punches on the press. Sensor 801 generates an electrical pulse in accordance with the movement of each punch past sensor 801. A mark or other sensable indicator may be placed on the turret at each punch position for sensing by sensor 801. Alternatively, the bolt or screw which holds each punch into the turret may be sensed.

Successive pulses which are generated by sensor 801 are fed along a conductor 803 via an optical isolation circuit 804. An exclusive OR gate 806 passes the signal of conductor 803 to a voltage controlled oscillator/detector circuit 805 via input conductor 813. Oscillator/detector 805 generates an oscillating output along a conductor 807 connected to a counter 809. The counter increments in response to the oscillating signal on conductor 807. The most significant bit output of counter 809 is transmitted back to oscillator/detector 805 via a conductor 811 for phase comparison with the oscillating signal input from conductor 813. Oscillator/detector 805 changes the frequency of the output signal on conductor 807 in order to place the two oscillating input signals 811, 813 into phase.

Thus, each bit in the count of counter 809 represents an incremental time slot between the movement of successive punches past the punch proximity sensor 801. The count output of counter 809 is monitored by microprocessor 84 via buffer 815.

Exclusive OR gate 806 serves as a programmable inverter. Microprocessor 84 inverts the signal appearing on conductor 803 via conductor 802. This permits a change in the leading edge of the oscillating signal for conformance with oscillator detector circuit 805.

In order to initialize itself, processor 84 monitors the ADF signal via converter 405 (FIG. 11). As the ADF voltage increases to the peak and then begins to decrease, the processor determines the peak point. At that time the processor retrieves the count stored in buffer 815 (FIG. 12) as an indication of the time slot during which compression (or precompression or release) takes place. Thus, the microprocessor determines the angular position of the turret within which the peak values occur during the compression, precompression and release modes. Microprocessor 84 stores in its memory those time slots for use in retrieval of peak values from peak detector 209 (FIG. 8).

Microprocessor 84 retrieves the peak data from A-to-D converter 405 (FIG. 11) by transmitting the stored peak count to a comparator 817 (FIG. 12) for comparison with the repeating counts in counter 809. When the comparison is made, comparator 817 generates an output signal "M" for indicating time of compression. Microprocessor 84 thus transmits to comparator 817 the particular time slot (count) in which it wishes the signal M to be generated. The signal M is generated for indicating that the multiplexer 401 should pass the associated analog signal to the sample and hold 403 and the A-to-D converter 405 should perform the conversion. The processor commands A-to-D converter to perform the conversion.

The M signal is used to interrupt microprocessor 84. Upon being interrupted, the microprocessor looks at the time slot count stored in comparator 817 for determining the appropriate routine to execute.

Referring to FIG. 10, the subsequent occurring peak (at t20) will occur, for example, 16 time slots after the peak (at t4) of the previous punch. In order to detect the subsequent peak, the peak detector 209 needs to be reset prior to time t20. The microprocessor thus will reset peak hold at t12 in preparation for detecting the peak of the next compression waveform.

Similarly, if the peak of the precompression waveform (ADF2) occurs at a time t2 (FIG. 10), the microprocessor monitors the counter 809 (FIG. 12) via comparator 817 for indicating the time occurrence of the peak of the precompression curve (ADF 2) for passing the precompression signal to sample and hold circuit 403 and commanding conversion by the A-to-D converter. The microprocessor then resets the peak hold circuit at the appropriate time via its associated control logic 217. Thus, a number of peak detector circuits can be controlled using a single magnetic sensor monitoring the punches moving into the compression area.

Referring to FIG. 12, a turret sensor 701 is positioned in a fixed relationship with the tablet press for monitoring a mark or other indication on the rotating turret. Sensor 701 generates a voltage pulse signal along a conductor 703 indicating that a single turret revolution has occurred. This indication is fed to microprocessor 84. An optical isolation circuit 705 ma be utilized between sensor 701 and conductor 703 as will suggest itself.

Referring again to FIG. 4, a reject gate controller logic 501 is directly controllable by microprocessor 84 for actuation of gate 503 to deflect the tablet into discard bin 58. Solenoid valves 70, 72 are electrically actuated by controller 501 for operation of gate 503.

Microprocessor 84 is programmed with information as to the relative position of the reject gate from the release compression stage. Thus, the microprocessor will know the number of time slots, i.e., the angular position of the turret at which to actuate the reject gate. Alternatively, a magnetic sensor may be used which can be monitored by the microprocessor for actuation of the reject gate a predetermined time after sensing by the magnetic sensor.

Reject gate controller logic 501 (FIG. 4) is actuated at a certain time slot, i.e., angular position of the turret, in order to open pressure valve 66 to pass air out of nozzle 54. A predetermined number of time slots later, reject gate controller logic 501 is again actuated by the microprocessor in order to close the pressure operated valve 66.

As understood, the operator adjusts the tablet press as well as the powder fill regulator in order to obtain the tablet of the desired physical characteristic that he or she seeks. After he has achieved the desired tablet in terms of size, weight, hardness, etc., he actuates the press controls 26 (FIG. 5) switching the system from its manual mode to its automatic mode and the control system takes over to continue producing such a tablet. The microprocessor 84 averages the compression forces of all the punches for one revolution. That average compression force information is stored in RAM 88 as a compression set point and is utilizable in order to continue to make the selected tablet when the operator places the system in the automatic mode. In the automatic mode the processor controls the compression with respect to the particular compression set point stored in RAM 88 by adjusting the powder fill regulator 83.

Microprocessor 84 stores in tabular form in RAM 88 the peak values for each punch for the precompression, compression and release stages. With that information, the microprocessor 84 generates an average compression force and compares that with the set point compression force in memory. If the comparison indicates too great of a deviation, the powder fill regulator 83 is adjusted to bring the average compression back towards the set point compression value.

Microprocessor 84 also compares each separate compression peak with respect to an upper and lower limit from the set point compression value in order to determine whether a particularly formed tablet should be rejected at reject gate 82. Microprocessor 84 decides whether to reject the tablet by comparing the compression force associated with the tablet with respect to a preset range of compression values.

If the particular punch that made the tablet is longer than the other punches, the particular compression force associated with that particular punch will always be higher than the other punches. This is true even though the amount of powder used to make the tablet, and thus the tablet weight, is the same.

In order to compensate for length of punches, the compression forces for a particular punch are averaged over a number of turret revolutions. That average is utilized to set or to establish a deviation from that average in order to decide whether to eject the tablet made by that punch. Thus, the length of the punches is automatically compensated by the computer.

As a digital compression value is retrieved from the A-to-D converter, that value is normalized in accordance with its particular associated punch to determine whether to eject the tablet. The compression force averages of all of the punches are averaged to come up with a single compression average. Then the separate compression average of a particular punch is compared with the overall average. The difference in the average compression for a particular punch with respect to the overall punches average is used as a compensation value to bring the compression force of that particular punch to a normalized value. The difference in the average is substracted from the output of the A-to-D converter in order to normalize the compression force for that particular punch. Thus, as each punch's compression force is normalized, the normalized compression force is compared with a single deviation value. This serves to eliminate punch length variations on their compression values and provide the operator with a single set of deviation limits. With a single deviation limit the operator is able to tell how well the flow of powder into the die pocket is occurring.

In order to adjust the compression forces, particular punches can be interchanged with one another on the tablet press. The computer is able to determine from the highest average compression force (as to particular punches) and the lowest average compression force (as to particular punches) which punches should be switched in order to bring the punches more towards the average compression force. One of the punch pairs (of the two punches at a punch location) with the highest compression average should be switched with one of the punch pairs with the lowest compression average. This is to obtain a uniform tablet hardness, if tablet hardness is a consideration in the product, as for example where the product is to have certain time release characteristics. The weight of the tablet, of course, does not change, only its tablet hardness.

Figure 13:
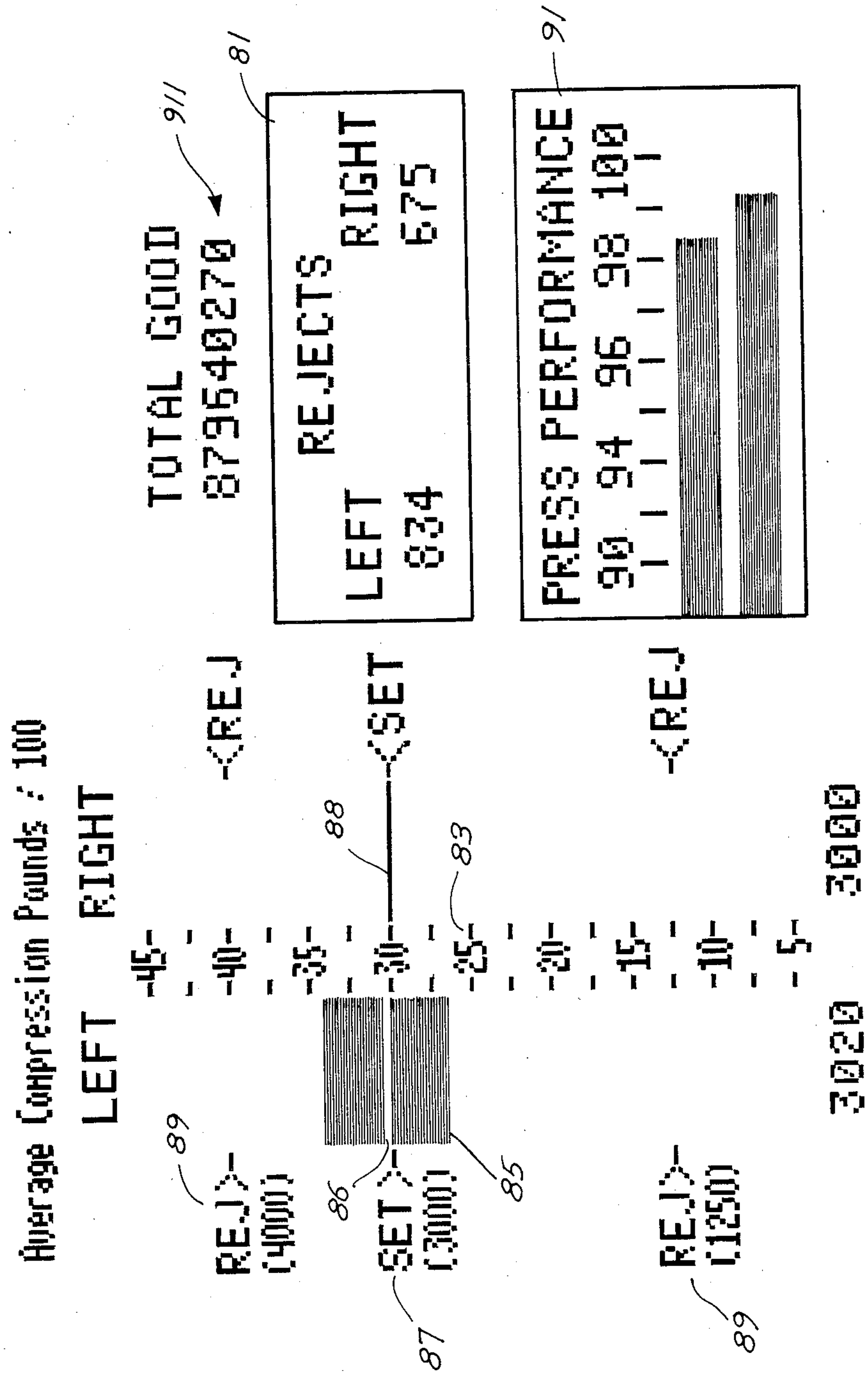
FIG. 13, is an illustration of a graphic display produceable by the controller of FIG. 1.

Referring now to FIG. 13, a display performed by the master CPU is illustrated. The CPU generates at a location 911 a total count of the number of good (non-rejected) tablets produced by the rotary press. This output is continuously incremented during the operation of the press. Likewise, a display 812 indicates the number of rejects, that is the number of tablets rejected from either side of the double press mechanisms. As will suggest itself, the total count of tablets does not include the tablets sampled or discarded at press start-up or shut-down. That is, in the manual mode no counting occurs until the system is switched to automatic mode.

Alternatively to display 911, a buzzer or alarm may be generated which signals the operator to empty the good tablet container bucket when it reaches its capacity. The number of tablets could be set via keyboard 24. Instead of actuation of an alarm, the alarm signal can be used to actuate a solenoid to change buckets or to perform other actions in accordance with the desire of the operator.

The master CPU also displays information regarding the compressive forces on the various punches. A compression scale 831 indicating in hundredths of pounds is displayed vertically. To the left and right of compression scale 831, compression indications are provided respectively for the left and right half of he double rotary press. An historic range of average compression forces is illustrated by a bar scale 851 displayed in black with the averaged compression forces of the last revolution displayed in white (861). Alternatively, only the averaged compression forces of the last revolution can be displayed as shown at 881.

The display can show the compression to which the press is set (set point) and the bar scale will show variations above and below that desired force level. In FIG. 13, the left array of punches is set at 3,000 pounds and the right array at 3,000 pounds, as indicated by the indicia "SET" 871. Likewise, the upper and lower limits of rejection (location 891) can be displayed, showing what compressive forces in the punches will result in operation of the reject gate mechanism 503.

A display of press performance (location 913) is shown indicating a statistical analysis of the compression force information at frequent intervals. The CPU 90 calculates the standard deviation using information of the average force, maximum force, and minimum force. The co-efficient of variation can then be calculated using the standard deviation. The co-efficient of variation is displayed as a percent substrated from 100 and gives the operator a real time measurement of the variation from interval to interval of the press operation. This can be calculated once every revolution. This is shown visually in box 913.

Figure 14:
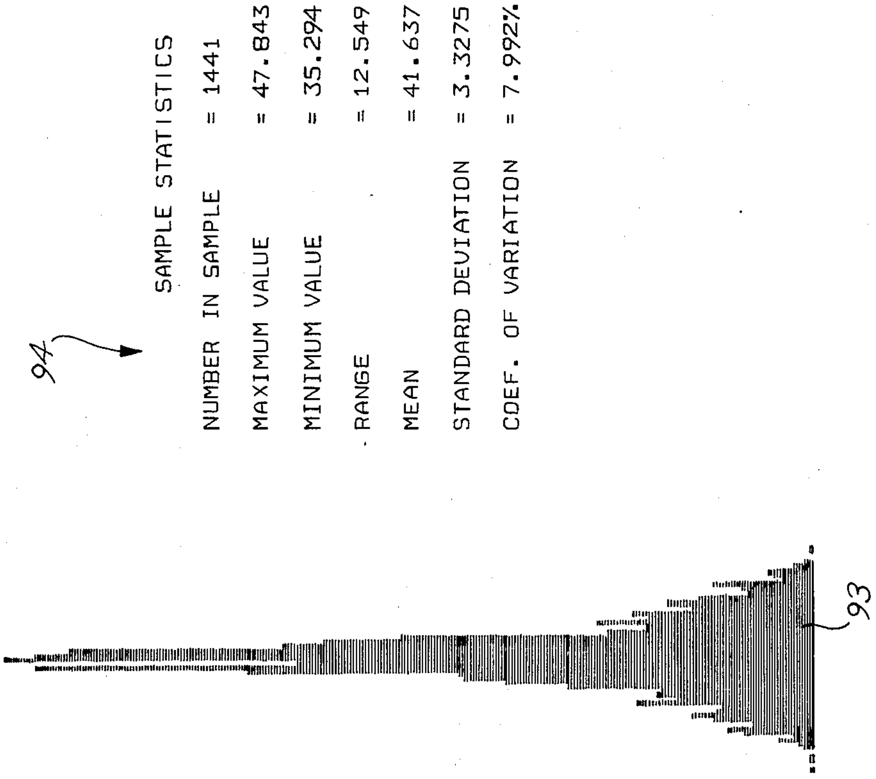
FIG. 14 is an illustration of a second graphic display produceable by the controller of FIG. 1.

FIG. 14 illustrates a histogram 931 displaying the number of tablets produced at their various compressive forces. Force is plotted along the X-axis and the number of tablets are displayed in vertical bar graph form, allowing a visual indication of all of the compressive forces. Also, actual data can be generated next to the histogram as shown at 941.

Figure 15:
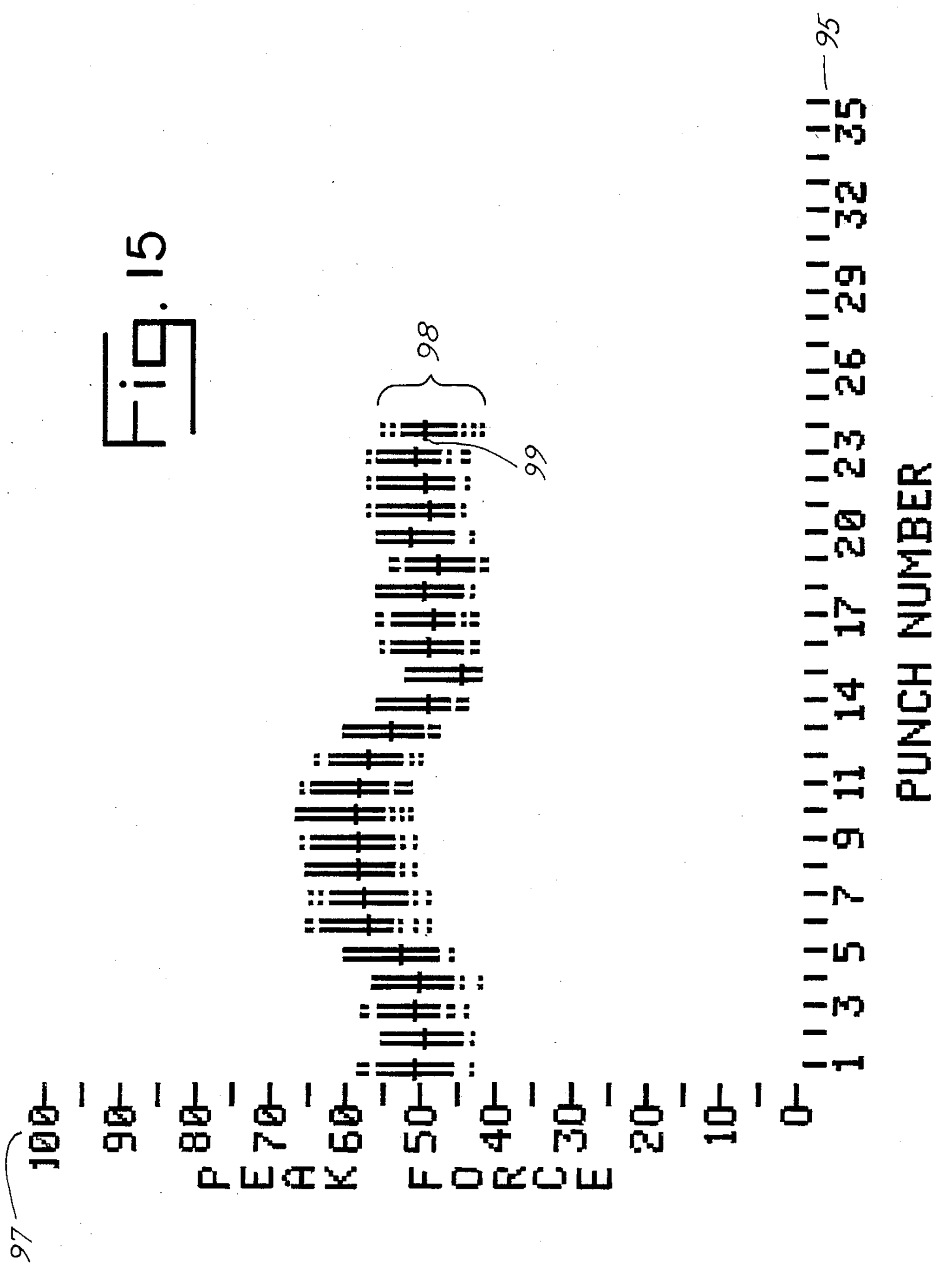
FIG. 15 is an illustration of a third graphic display produceable by the controller of FIG. 1.

A third display is illustrated in FIG. 15. The compressive force for each punch for a particular side of the doublesided press can be illustrated, with the punch number illustrated on the X axis 951 and peak force amplitude illustrated on the Y axis 997. The plot shows the range of compressive force amplitudes 981 for each punch, as well as shows the punch peak force 991 of the last revolution. The information displayed in FIG. 15 allows proper adjustment of individual punches so as to minimize the total variation from the lowest punch peak compressive force to the highest punch peak compressive force. Thus, the total variation of all tablets produced will be reduced. For example, as shown in FIG. 15, on of the punch pairs of punch 10 may be replaced with one of the punch pairs of punch 15.

Figure 16:
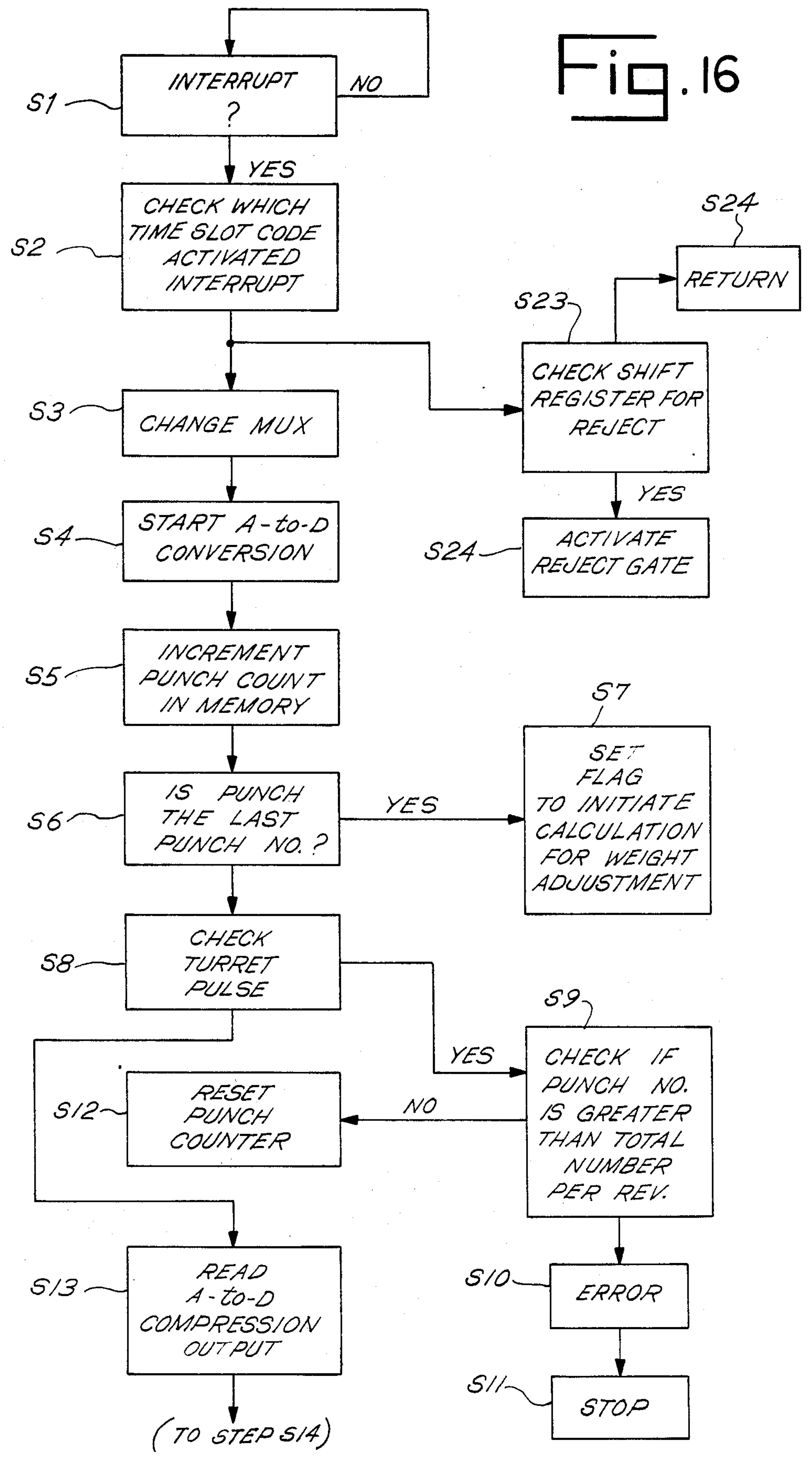
FIGS. 16–19 are flow diagrams of program flow of the control system; of FIG. 5.
Figure 17:
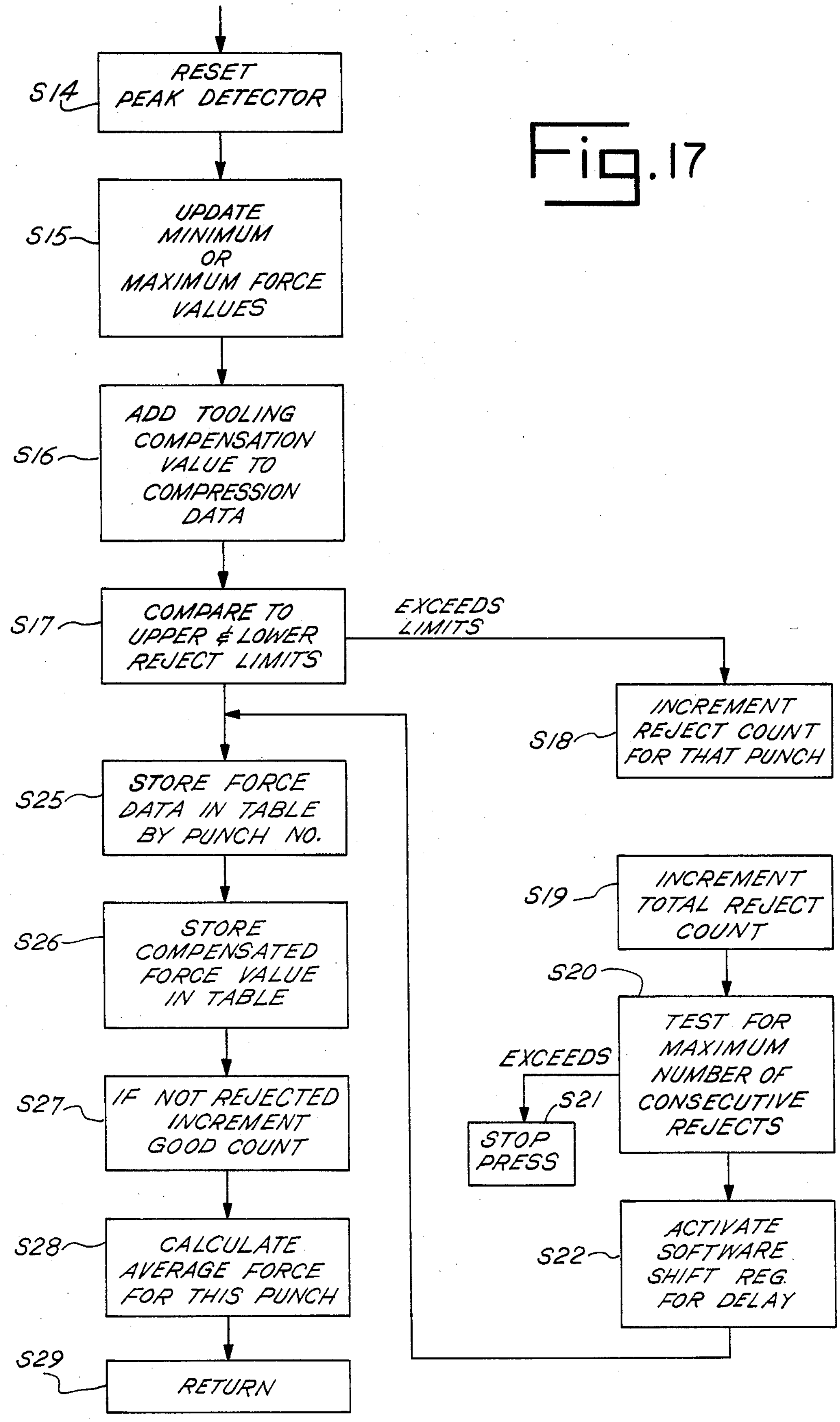
Figure 18:
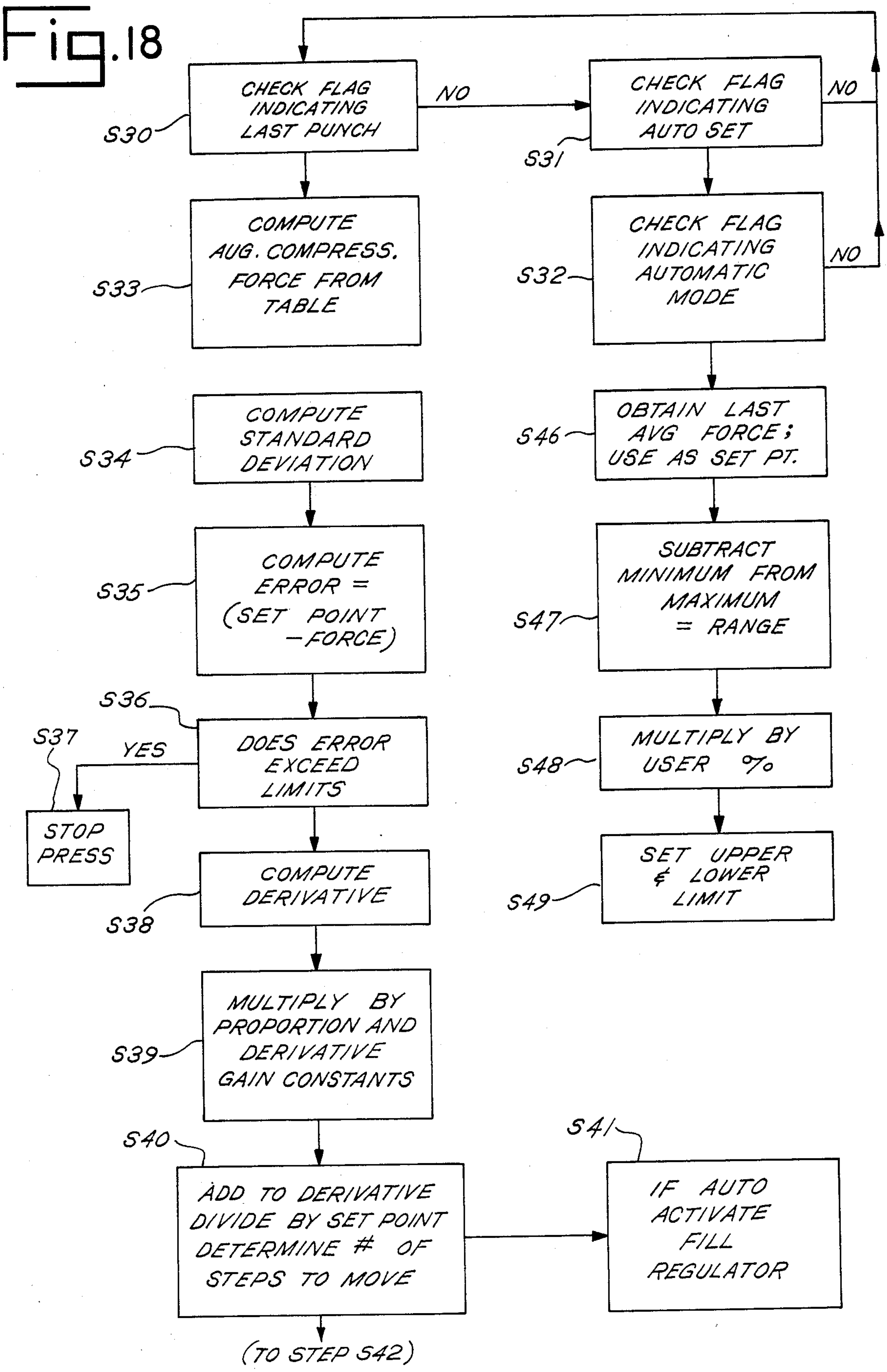
Figure 19:
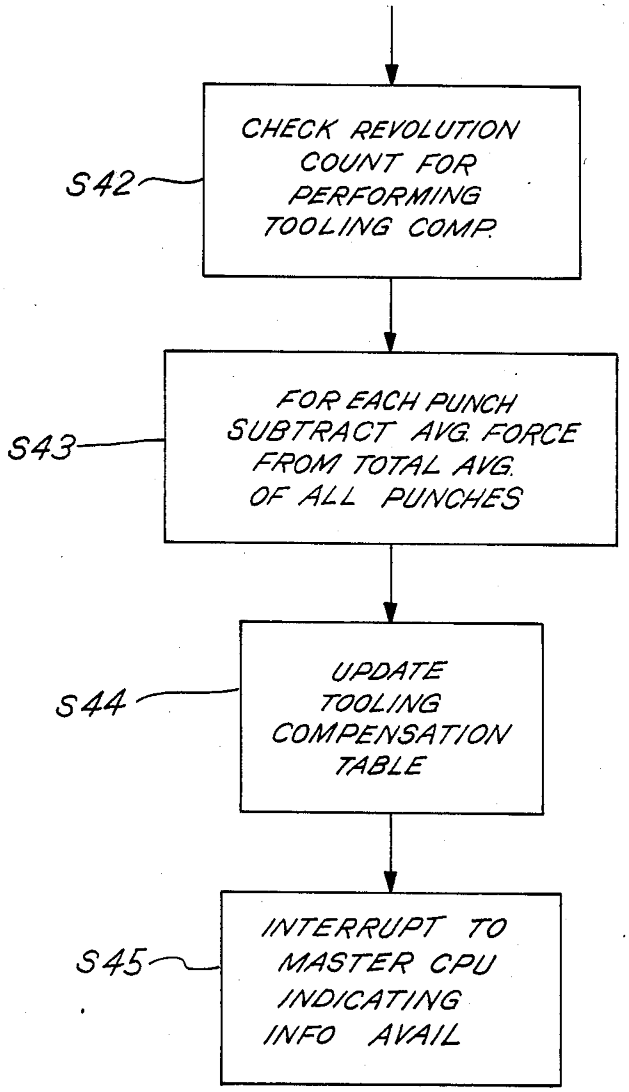

Referring to FIGS. 16–17, a flow diagram of the program flow of a foreground program of microprocessor 84 (FIG. 5) is illustrated. Initially at step 51, microprocessor 84 waits for an interrupt signal M from comparator 817 (FIG. 12). The interrupt is generated for telling the software that one of the three compression time slots is occuring, i.e., precompression, compression or release. These time slots are determined during initialization, as discussed above, and are repetitively fed to comparator 817 in succession by either the foreground program (FIGS. 16–17) or the background program (FIGS. 18–19). During initialization, the time slots are determined and stored in the program in RAM 88.

The interrupt may also tell the software that a tablet is in position for reject by reject gate 503. The time slot indicating tablet reject position is also determined by the microprocessor and is fed in sequence to comparator 817. During set up of the machine, the installer manually turns the turret and aligns a reject sensor on the machine for sensing to tell the microprocessor that the tablet is in its reject position. The output of the sensor is monitored by the microprocessor to determine the time slot at which the tablet reaches the reject position. As understood, the reject time slot may be adjusted by the program in accordance with the speed of the turret which can be determined in accordance with the rate of VCO (805).

At step S2, the microprocessor checks which time slot code it last fed to comparator 817, which caused the interrupt. Depending on whether the precompression or release stage is occurring, data will be retrieved and stored in different tables in RAM 88; also, when the compression stage is occurring the powder fill regulator and the reject gate may be activated. Thus, different program routines may be initiated depending on the time slot code determined at step S2.

The compression routine is illustrated, however reference will be made to the precompression and release stage routines as well. At step S3, the multiplexer 401 (FIG. 11) is instructed to pass the OUT signal of the compression force (or precompression or release force) to the sample-and-hold circuit 403 for conversion by A-to-D converter 405. At step S4, A-to-D converter 405 is instructed to perform the conversion, placing the digital signal onto bus 406. Steps S3, S4 are performed for each of the routines for precompression, compression and release interrupt.

Figure 20:
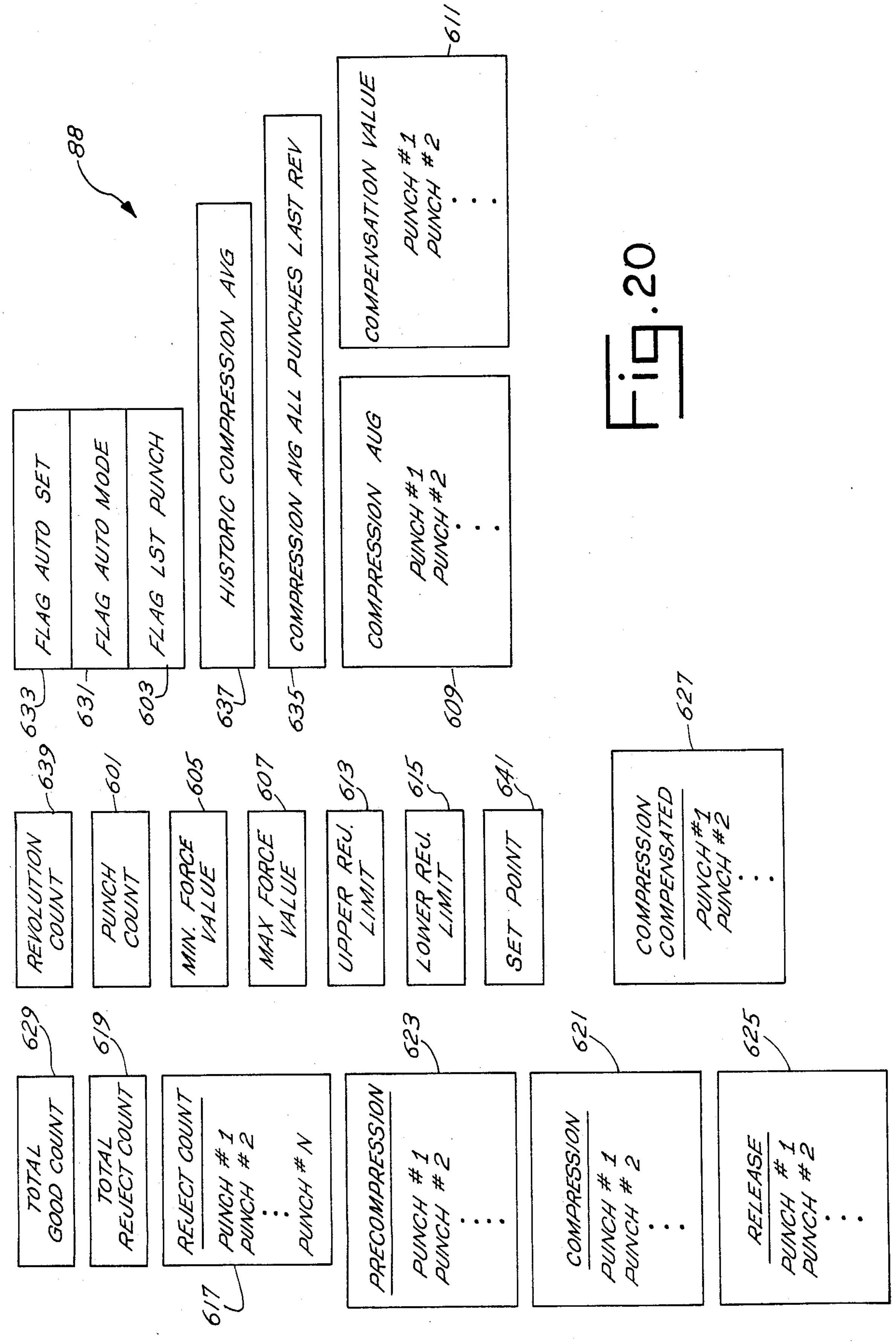
FIG. 20 is a diagrammatic representation of RAM memory of the control.

Referring to FIG. 20, the count of the particular punch which is being monitored is stored in RAM 88 at memory location 601. At step S5 (FIG. 16), the punch count stored in location 601 (FIG. 20) is incremented to indicate that a new punch is being monitored. As will suggest itself, step S5 need only be executed during, for example, the precompression stage and need not be incremented during the compression and release stages of the same punch. A software shift register may be utlized to determine incrementation of the punch count, as will suggest itself.

At step S6, the value of the punch count in location 601 is analyzed to determine whether or not the punch being monitored is the last punch in the turret revolution. If so, a flag is set in memory location 603 of the RAM, step S7, for flagging the possible initiation of calculations for weight adjustment of the tablets. This flag is monitored by a background program, described hereinafter, for controlling powderfill regulator 83.

At step S8, the microprocessor checks the output of turret sensor 701 (FIG. 12) on bus 703 to determine if the turret has made a complete revolution. If so, the punch count in memory is reviewed at step S9 to make sure that it is not greater than (or less than) the total number of punches in the system. If it is greater (or less than), an error signal is generated and the press is stopped at steps S10, S11. If the turret has completed a single revolution, the punch count in RAM 88 is reset at step S12.

At step S13, A-to-D converter 405 (FIG. 12) is read via bus 406. After reading the force data from A-to-D converter 405, the corresponding peak detector (precompression, compression or release) is reset at step S14 (FIG. 17). As will suggest itself, the time of reset of the compression peak detector can be established according to a time slot between the peak time slots for the compression force.

If the data being processed is force data for the compression stage, this data is compared with minimum and maximum compression force values which are stored in RAM 88 at locations 605, 607. At step S15, the compression value read from A-to-D converter 405 in step S13 is compared with the minimum and maximum force values stored in RAM 88 for updating either of the values depending upon the magnitude of the value determined in step S13.

As discussed above, the compression force may be compensated in accordance with the length of its particular punch. The compression forces for the particular punch have been averaged over a number of turret revolutions, in accordance with later steps of this program discussed hereinafter. That average is stored in table 609 of RAM 88 and is utilized to establish a tool compensation value stored in table 611. The compensation value for the particular punch is added to the compression data at step S16. This effectively adjusts the data in accordance with the tool length. As will suggest itself, this feature may be selected by the operator via input 24 (FIG. 1), as to whether to perform step S16. As discussed above, Master CPU 90 is able to modify the program of microprocessor 84 which is stored in RAM 88.

The compression data is then compared at step S17 with upper and lower reject limits. These limits have been stored in RAM 88 at locations 613, 615 as described hereinafter. In the event that the compression data exceeds the reject limits, a reject count being stored in RAM 88 at location 617 is incremented for that particular punch, at step S18. Also, a total reject count stored at location 619 in RAM 88 is incremented at step S19. A step S20, a test is performed for determining whether a maximum number of consecutive rejects has occurred. If this number has been exceeded, the press is stopped at step S21.

As step S22, a software shift register is activated in order to establish a time delay for activating the reject gate at the proper time. Between the compression point for a tablet and the reject point for that same tablet, a number of tablets may be compressed and thus a number of interrupts (M) may be generated. One is set in the shift register to synchronize actuation of the reject gate and the shift register is shifted to indicate the rotary angular position of the tablet relative to the reject gate.

A routine addressed by the time slot code at step S2 (FIG. 16) includes step S23 which checks the shift register for an indication of whether the tablet appearing in front of nozzle 54 should be rejected. Thus, an interrupt signal M is generated each time a tablet appears in front of nozzle 54 in order to ask microprocessor 84, at step S23, whether the tablet should be rejected. If the shift register indicates that rejection should occur, reject gate 503 is activated via reject gate controller logic 501 (FIG. 4) at step S24 to wait for an interrupt at step S1.

As understood, the position of the tablet to be rejected is associated with the angular position of the turret via interrupt M and thus variations in turret speed will be compensated for. That is, a tablet to be rejected may vary in its time of arrival at the reject gate depending upon the turret speed. Therefore, merely generating a time delay after compression will not provide sufficient guarantee of tablet position.

After the comparison with reject limits and the possible activation of the software shift register at step S22 (FIG. 17), the compression data is stored in RAM table 621 (or precompression table 623 or release table 625) according to punch number, at step S25. Also, the high and low compression force values are stored in RAM 88 for use to generate the punch display of compression ranges in FIG. 15. Also, the force value compensated at step S16 is stored in RAM table 627 by punch number, at step S26.

At step S27, a count stored in RAM location 629 indicating that a good tablet has been pressed is incremented at step S27.

A step S28, the compression data is utilized to recalculate a separate compression average for the particular punch being monitored for storage in table 609. Return is made at step S29 to wait for the next interrupt at step S1.

As will suggest itself, the program flow may occur in a different order than that shown in the drawings.

Referring to FIGS. 18–19, a flow diagram program flow of a background program of microprocessor 84 is illustrated. Microprocessor 84 checks three flags at steps S30, S31 and S32 in RAM locations 603, 631, 633. If at step S30, the flag indicates the completion of a revolution, the compression force average for all punches for the last revolution is calculated at step S33. Each of the compression values for all punches are averaged. This value is stored in RAM location 635. An historic compression average table 637 may be kept for use to provide data in a CRT display form to the operator. Such historic data may include data sufficient to indicate the range of average compression forces for generating display 851 (FIG. 13), as discussed above.

Next, at step S34, the microprocessor computes a standard deviation using information of the average force, maximum force and minimum force. The co-efficient of variation can then be calculated using the standard deviation and displayed as shown in display box 913 of FIG. 13, as discussed above. Other statistical data may also be calculated and stored in RAM for use by Master CPU for display of information to the operator.

At step S35, an ERROR value is computed as the difference in the set point and the average compression force of the last revolution (RAM location 635). The set point is stored at RAM location 641, as described hereinafter. If the ERROR value exceeds certain limits of deviation, the press is stopped at steps S36, S37.

At step S38, the derivative of the ERROR value is computed, i.e., the rate of change of the ERROR. An historical account of the ERROR values are stored in RAM so that the derivative may be computed. Once a derivative has been computed at step S38, a proportional error is calculated by multiplying the value by a constant (which is stored in memory and depends on various variables as understood by those in the art) and a proportional derivative value is calculated by multiplying the derivative value by a derivative gain constant (also stored in memory), (Step S39). This proportional error is then added to the proportional derivative value, the sum of which is then divided by the set point to scale the correction value (Step S40). From this information, the number of steps to move the powder fill regulator is determined. When the system is in the automatic mode, the fill regulator is activated accordingly (Step S41).

At step S42, the revolution count stored in RAM location 639 is checked for performing a tooling compensation. This may be done once every so many revolutions, as for example, once every sixteen revolutions. The operator may change the number of revolutions at which tooling compensation is performed through input 24 via Master CPU 90.

Tooling compensation is performed at step S43. The average compression force for each punch (as calculated over 16 revolutions) is subtracted from the total average of all punches (calculated over 16 revolutions). Compensation value table is then updated with the figures for each punch, at step S44. The compensation value table is computed at start up after 16 revolutions and thereafter only on demand.

Finally, at step S45, an interrupt is sent to the Master CPU for indicating that information is available in RAM 88 for display.

Referring again to FIG. 18, at steps S31, S32, if both flags indicating auto set and automatic mode are set, the microprocessor enters the automatic mode. Both of these flags are set by the Master CPU in response to operator controls. At step S46, the last average compression for all punches for the last revolution (RAM location 635) is used as the set point in RAM location 641.

At step S47, the difference between the minimum and maximum force value (RAM locations 605, 607) is used to establish the range value. This range value is multiplied by a user supplied percentage which establishes the upper rejection limit and the lower rejection limit (RAM locations 613, 615), at steps S48, S49.

What is claimed is:

1. An apparatus for measuring and displaying information regarding tablets being produced in a rotary tablet press having a mechanism for rejecting defective tablets and having a plurality of tablet dies each with and associated tablet punch set, comprising, in combination:

means for monitoring tablet producing compression at at least one tablet die location and generating successive tablet compression data each time said press rotates, each said tablet compression data indicative of a tablet compression related to a single tablet;

data processing and mechanism control means, connected to said monitoring means, for successfully retrieving each said tablet compression data and processing each said retrieved tablet compression data prior to retrieving the next tablet compression data, said data processing and mechanism control means controlling operation of the defective tablet rejection mechanism according to processed data for a separate tablet, said tablet data processing and mechanism control means operating in accordance with a first master clock signal; data storage means, connected to said data processing and mechanism control means, for addressably recording at least a portion of the information processed by the data processing and mechanism controlling means, said data processing and mechanism control means accessing said data storage means solely during a first portion of said master clock signal;

central data processing means connected to said data storage means for processing data recorded therein by said data processing and mechanism control means, said central data processing means processing information stored in said data storage means concurrent with the retrieval and processing of tablet compression data by said data processing and mechanism control means, said central data processing means operating in accordance with a second masterclock signal and said central data processing means accessing said data storage means solely during a second portion of said second master clock signal, said second portion of said second master clock signal occurring at a time out of phase with said first portion of said first master clock signal whereby said data processing and mechanism control means and said central data processing means synchronously share said data storage means; and display means controlled by said central data processing means, for displaying tablet compression information processed from tablet compression data retrieved and processed by said data processing and mechanism control means.

2. Apparatus according to claim 1 and further including rotary angular position means for monitoring the rotational position of the tablet punch sets and generating a position signal for indicating the rotary angular position of the punch sets in time, and wherein said data processing and mechanism control means is responsive to said position signal for initiating retrieval of a said tablet compression data at a specific rotary angular position of the dies.

3. Apparatus according to claim 2 wherein said data processing and mechanism control means is responsive to a rotary angular position of the punch sets for controlling the operation of the defective tablet rejection mechanism for rejecting a defective tablet.

4. Apparatus according to claim 2 wherein said rotary angular position means includes an oscillator responsive to the rotary movement of the dies for generating a first oscillating signal and includes a counter for counting according to said first oscillating signal and generating an output count signal representative of the rotary angular position of the punch sets.

5. Apparatus according to claim 4 wherein said rotary angular position means includes:

a punch proximity detector for sensing the punch sets as they move relative to said detector for generating a second oscillating signal; and a phase detector means for varying the frequency of said first oscillating signal in accordance with the relative phase relationship of said first oscillating signal and said second oscillating signal.

6. An apparatus according to claim 1 wherein said data processing and mechanism control means analyzes a retrieved tablet compression data of one tablet for deciding whether to reject said one tablet prior to retrieving tablet compression data for the next tablet produced following production of said one tablet.

7. An apparatus according to claim 1 wherein said second master clock signal is 180 degrees out of phase with said first master clock signal.

8. Apparatus according to claim 1 wherein said monitoring means generates an analog signal representative of the compression force during tablet producing compressions and wherein said monitoring means is controllable by said data processing and mechanism control means for selecting approximate peak points of said analog signal as said successive tablet compression data.

9. Apparatus according to claim 8 and further including rotary angular position means for monitoring the rotational position of the tablet punch sets and generating a position signal for indicating the rotary angular position of the punch sets in time, and wherein said data processing and mechanism control means is responsive to said position signal for controlling said monitoring means for selecting the approximate peak points of said analog signal as said successive tablet compression data.

10. Apparatus accordance to claim 9, wherein said rotary angular position means includes a counter for generating said position signal, said position signal formed of digital output counts representative of rotary angular positions of the punch sets, and wherein said data processing and mechanism control means monitors said analog signal for determining the digital output count of said counter at the peak point of said analog signal.

11. Apparatus according to claim 11 wherein said data processing and mechanism control means executes a program and wherein said monitoring means includes interrupt means for interrupting said program in response to said counter reaching a preselected digital output count.

12. An apparatus as claimed in claim 1, wherein the rotary press includes a second mechanism to regulate fill of powder in the dies, and wherein said data processing and mechanism control means also controls operation of the second mechanism.

13. An apparatus as claimed in claim 1, wherein said monitoring means for generating tablet compression data, said data processing and mechanism control means, and said data storage means together comprise a first press control unit, and wherein the apparatus further comprises at least a second press control unit, each said press control unit connected by its data storage means to said central data processing means for processing the tablet compression data, said central data processing means accessing independently each said data storage means of said press control units.

14. An apparatus for measuring and displaying information regarding tablets produced in a rotary tablet press having a mechanism for rejecting defective tablets and having a plurality of tablet dies each with an associated tablet punch set which rotate relative to cams for compression of the punch sets to form the tablets, comprising, in combination:

monitoring means for monitoring the tablet producing compression of each tablet punch set at at least one press location as the punch sets rotate pass the press location, said monitoring means being selectively actuated for generating successive tablet compression data as said press rotates, each said tablet compression data indicative of a tablet compression related to a single tablet;

rotary angular position means for monitoring the rotational position of the tablet punch sets and generating a position signal which changes with the rotation of the punch sets relative to said press location for indicating the rotary angular position of the punch sets;

data processing and mechanism control means, connected to said monitoring means and said rotary angular position means and responsive to said position signal for selectively actuating said monitoring means at predetermined angular positions of the punch sets for successively retrieving tablet compression data, said data processing and mechanism control means processing each said retrieved tablet compression data and controlling operation of the defective tablet rejection mechanism according to processed data for a separate tablet;

data storage means, connected to said data processing and controlling means, for addressably recording at least a portion of the information processed by the data processing and mechanism controlling means; and display means controlled by said data processing and mechanism control means, for displaying tablet compression information processed from tablet compression data.

15. Apparatus according to claim 14 wherein the mechanism for rejecting defective tablets is selectively actuable and wherein said data processing and mechanism control means is responsive to said position signal for selectively actuating the mechanism for rejecting defective tablets.

16. Apparatus according to claim 14 wherein said rotary angular position means includes an oscillator responsive to the rotary movement of the dies for generating a first oscillating signal.

17. Apparatus according to claim 16, wherein said rotary angular position means includes:

a punch proximity detector for sensing the punch sets as they move relative to said detector for generating a second oscillating signal; and a phase detector means for varying the frequency of said first oscillating signal in accordance with the relative phase relationship of said first and second oscillating signal.

18. Apparatus accordance to claim 16 wherein said rotary angular position means includes a counter for generating said position signal, said position signal formed of digital output counts representative of rotary angular positions of the punch sets.

19. Apparatus according to claim 14 wherein said rotary angular position means is programmable by said data processing and mechanism control means for generating an interrupt signal when the rotational position of the tablet punch sets occupy a predetermined position, and wherein said data processing and mechanism control means is responsive to said interrupt signal.

* * * * *